(12) United States Patent
Rimmer et al.

(10) Patent No.: US 10,501,936 B2
(45) Date of Patent: Dec. 10, 2019

(54) MODULAR CEILING SYSTEM

(71) Applicant: Price Industries Limited, Winnipeg (CA)

(72) Inventors: Julian Rimmer, London (GB); Sherwin Barroga, London (GB); Sylvio Tessier, Winnipeg (CA); Arun Rabbani, Maidstone (GB); Ashley Morgan, Poole (GB); Mike Nicholson, Winnipeg (CA); Jordan Hiebert, Winnipeg (CA); Craig Comberbach, Winnipeg (CA); Christian Borja, Winnipeg (CA); Mike Holland, London (GB); James White, Isleworth (GB); Ryan Sorrell, London (GB); Mario Ortiz, London (GB); Luke Marvin, Winnipeg (CA)

(73) Assignee: Price Industries Limited, Winnipeg (CA)

( * ) Notice: Subject to any disclaimer, the term of this patent is extended or adjusted under 35 U.S.C. 154(b) by 0 days.

(21) Appl. No.: 15/907,954

(22) Filed: Feb. 28, 2018

(65) Prior Publication Data

US 2018/0251977 A1 Sep. 6, 2018

Related U.S. Application Data

(60) Provisional application No. 62/465,227, filed on Mar. 1, 2017.

(51) Int. Cl.
*E04B 9/00* (2006.01)
*B05B 15/62* (2018.01)
(Continued)

(52) U.S. Cl.
CPC .............. *E04B 9/006* (2013.01); *E04B 9/003* (2013.01); *B05B 15/62* (2018.02); *F21S 2/005* (2013.01);
(Continued)

(58) Field of Classification Search
CPC ........... E04B 9/006; E04B 9/003; G01K 1/14; G08B 17/10; H04R 1/02; H04N 5/2253; B05B 15/62; F21S 8/026
See application file for complete search history.

(56) References Cited

U.S. PATENT DOCUMENTS

| 4,751,624 | A | * | 6/1988 | Russo | ..................... F21V 25/10 362/276 |
| 4,930,054 | A | * | 5/1990 | Krebs | ..................... F21S 8/026 315/118 |

(Continued)

FOREIGN PATENT DOCUMENTS

| WO | WO-2004046810 A1 | * | 6/2004 | ............. E04B 9/006 |
| WO | WO-2013149679 A1 | * | 10/2013 | ............. E04B 9/006 |

*Primary Examiner* — Jeanette E Chapman
(74) *Attorney, Agent, or Firm* — Smith, Gambrell & Russell, LLP

(57) ABSTRACT

A modular ceiling system has uniformly appearing devices supported by a channel or a ceiling in an aesthetically pleasing pattern with a single network and control system. The channel or ceiling has uniform sized and shaped openings into which a plurality of uniformly sized and shaped devices is fitted. The devices share a common communication protocol and power source. Each of the devices is connected to a central control system having the same communication protocol as the devices. A network connects the central control system and all of the devices together allowing communications between the central control system and the devices and among the devices using the common communication protocol.

34 Claims, 33 Drawing Sheets

(51) Int. Cl.
*H04N 5/225* (2006.01)
*F21S 8/02* (2006.01)
*H04R 1/02* (2006.01)
*G08B 17/10* (2006.01)
*G01K 1/14* (2006.01)
*F21S 2/00* (2016.01)

(52) U.S. Cl.
CPC ............... *F21S 8/026* (2013.01); *G01K 1/14* (2013.01); *G08B 17/10* (2013.01); *H04N 5/2253* (2013.01); *H04N 5/2257* (2013.01); *H04R 1/02* (2013.01); *H04R 1/025* (2013.01); *H04R 1/028* (2013.01); *H04R 2201/021* (2013.01)

(56) References Cited

U.S. PATENT DOCUMENTS

| | | | | |
|---|---|---|---|---|
| 6,497,739 | B2* | 12/2002 | McGill | E04B 9/02 454/187 |
| 6,997,267 | B2* | 2/2006 | Kotovsky | A62C 35/60 169/16 |
| 7,685,786 | B2* | 3/2010 | Cousin | E04B 9/001 52/22 |
| 7,891,147 | B2* | 2/2011 | Bruder | E04B 2/7407 52/204.5 |
| 8,647,542 | B2* | 2/2014 | Zakaras | E04C 5/161 249/83 |
| 9,747,763 | B1* | 8/2017 | Scordato | G08B 7/06 |
| 2003/0095413 | A1* | 5/2003 | Jamison | F21S 8/02 362/396 |
| 2008/0010907 | A1* | 1/2008 | Moench | E04B 9/006 52/28 |
| 2008/0165535 | A1* | 7/2008 | Mazzochette | F21S 8/026 362/294 |
| 2011/0199290 | A1* | 8/2011 | Vendrow | G06F 3/023 345/156 |
| 2011/0299290 | A1* | 12/2011 | Mandy | F21V 21/04 362/366 |
| 2011/0317861 | A1* | 12/2011 | Haase | F21V 33/0056 381/333 |
| 2012/0113642 | A1* | 5/2012 | Catalano | F21S 8/02 362/249.02 |
| 2013/0265751 | A1* | 10/2013 | Edmond | F21S 8/026 362/231 |
| 2014/0063810 | A1* | 3/2014 | Randolph | F21K 9/00 362/294 |
| 2014/0245687 | A1* | 9/2014 | Grandi | E04B 9/006 52/506.05 |
| 2014/0307450 | A1* | 10/2014 | Cho | F21V 21/04 362/364 |
| 2016/0260305 | A1* | 9/2016 | Huang | G08B 21/14 |
| 2016/0366754 | A1* | 12/2016 | Villaume | H05B 33/0857 |
| 2018/0172260 | A1* | 6/2018 | Simonyi | F21S 8/026 |

* cited by examiner

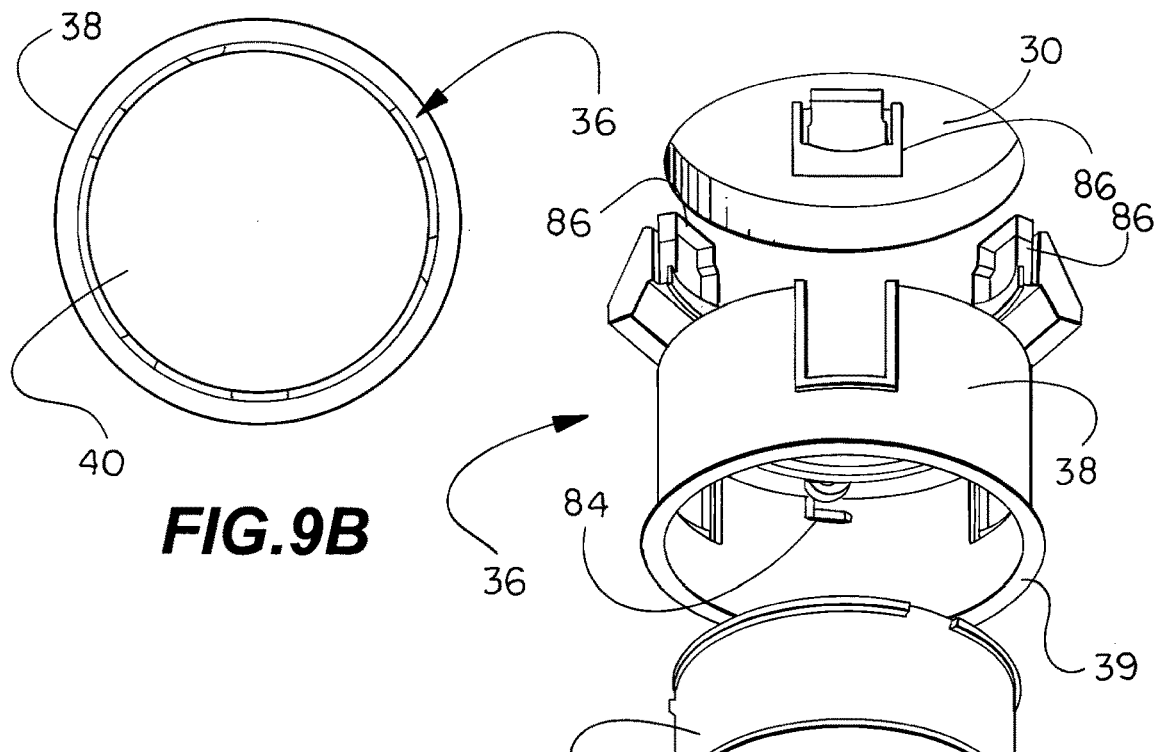
FIG.9B
FIG.9A
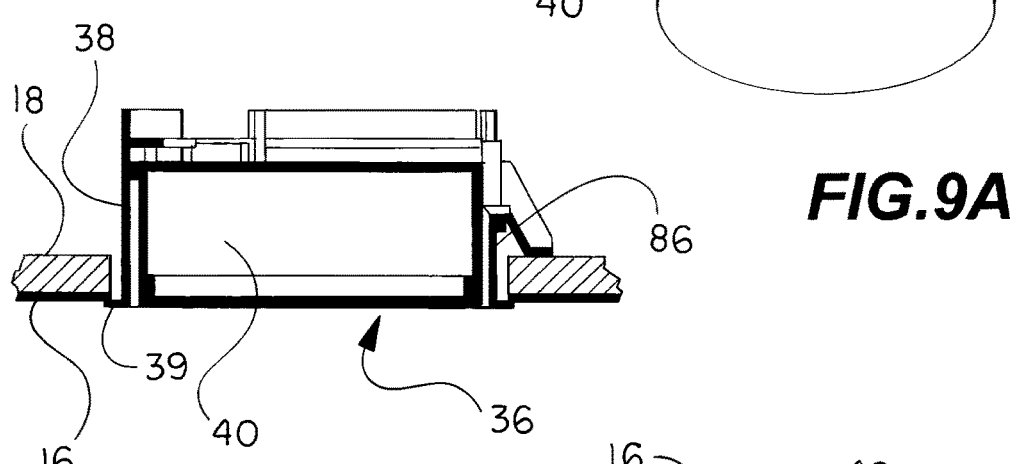
FIG.9D
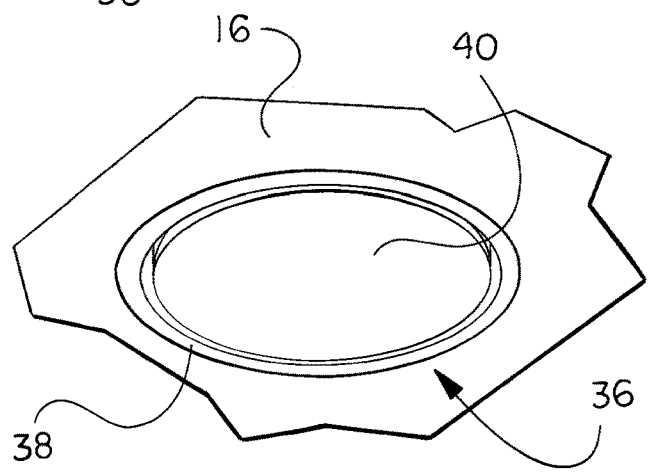
FIG.9C

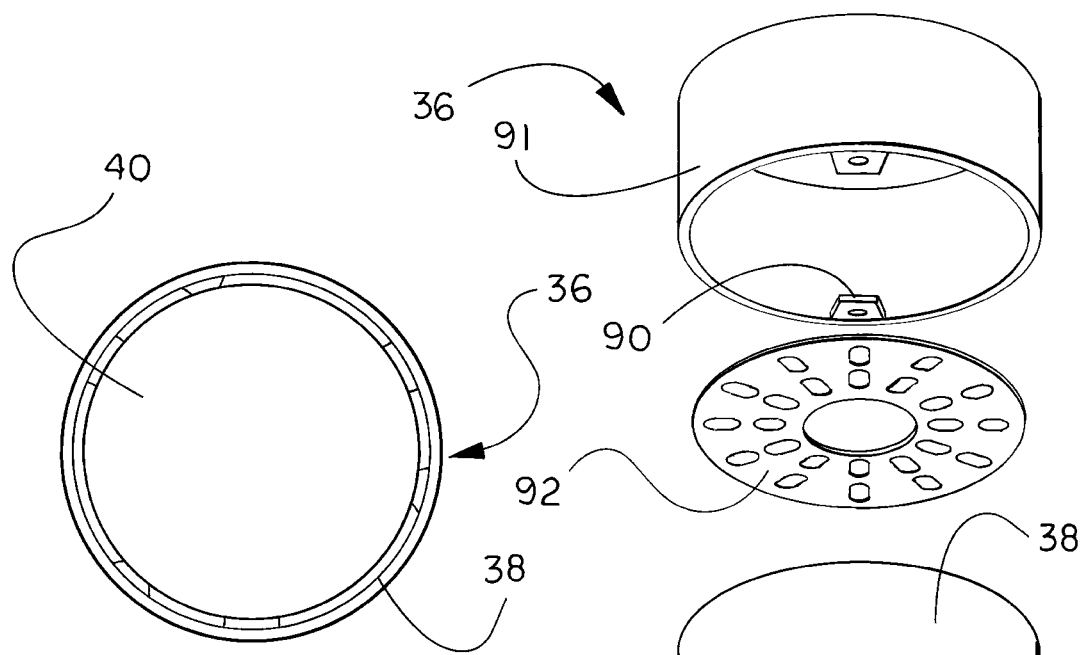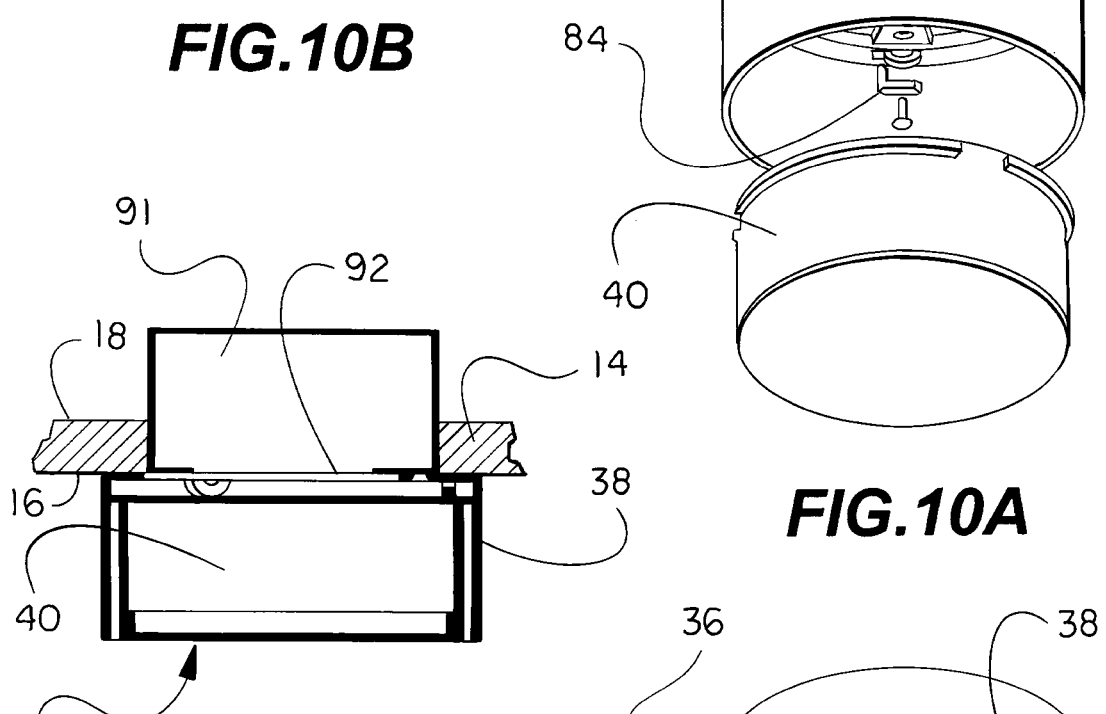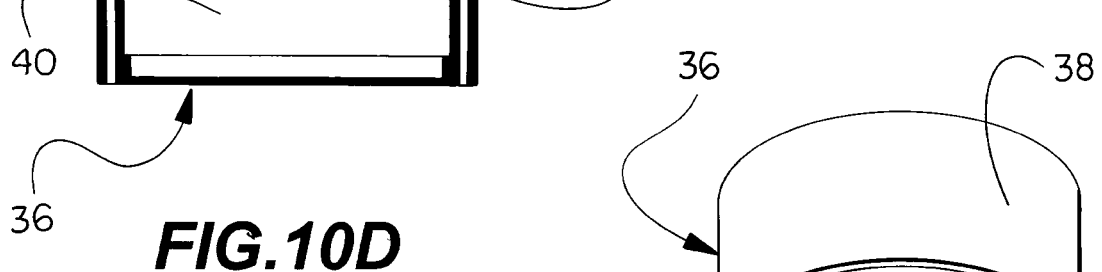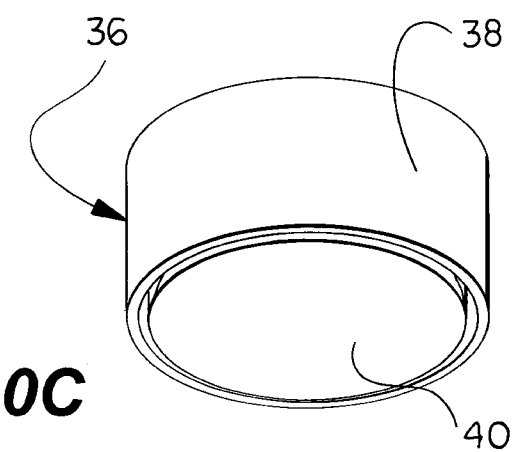
FIG.10B
FIG.10A
FIG.10D
FIG.10C

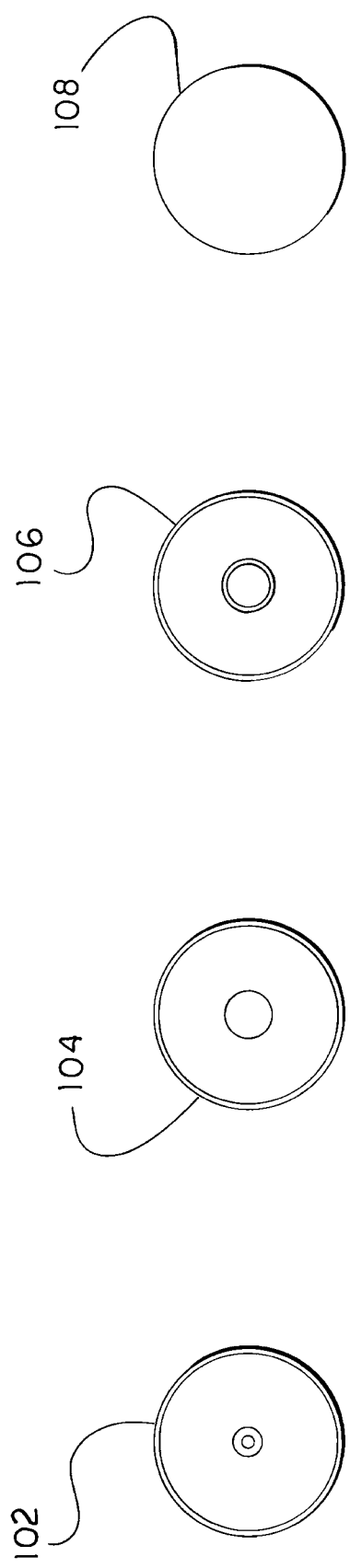
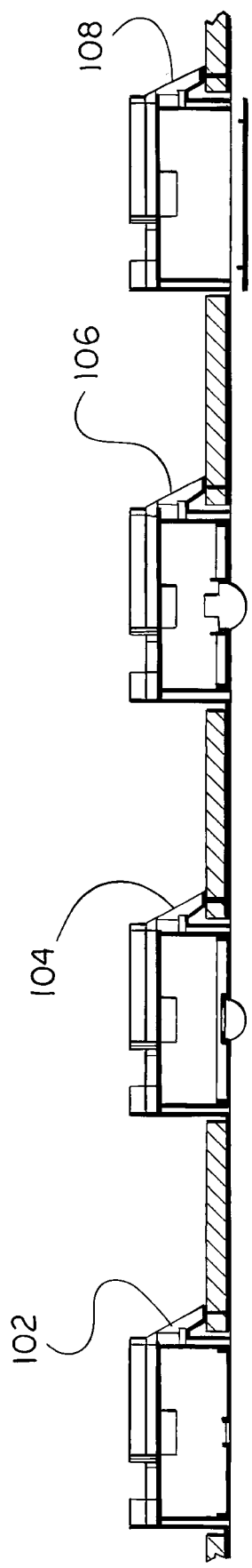
FIG.11A
FIG.11C

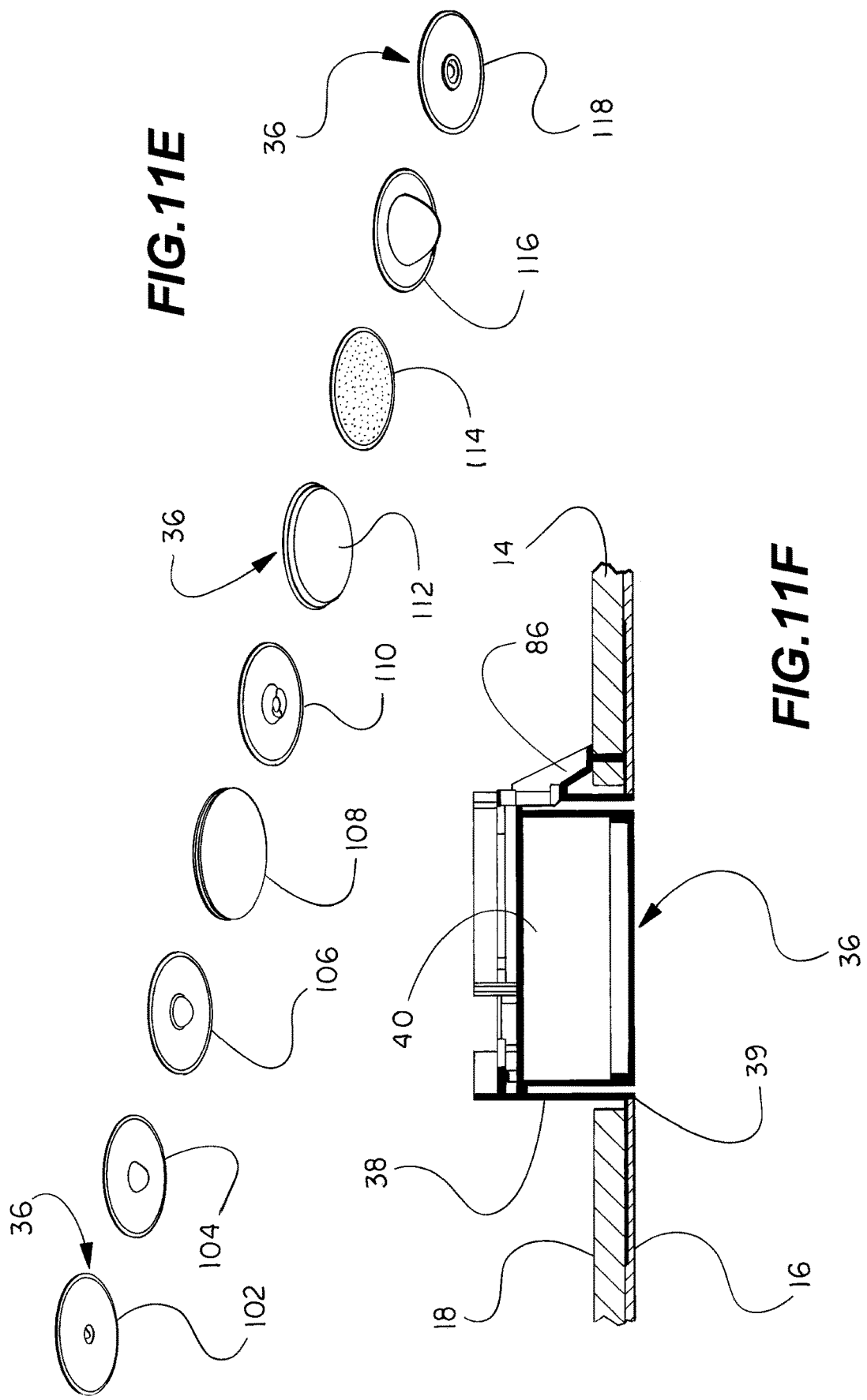

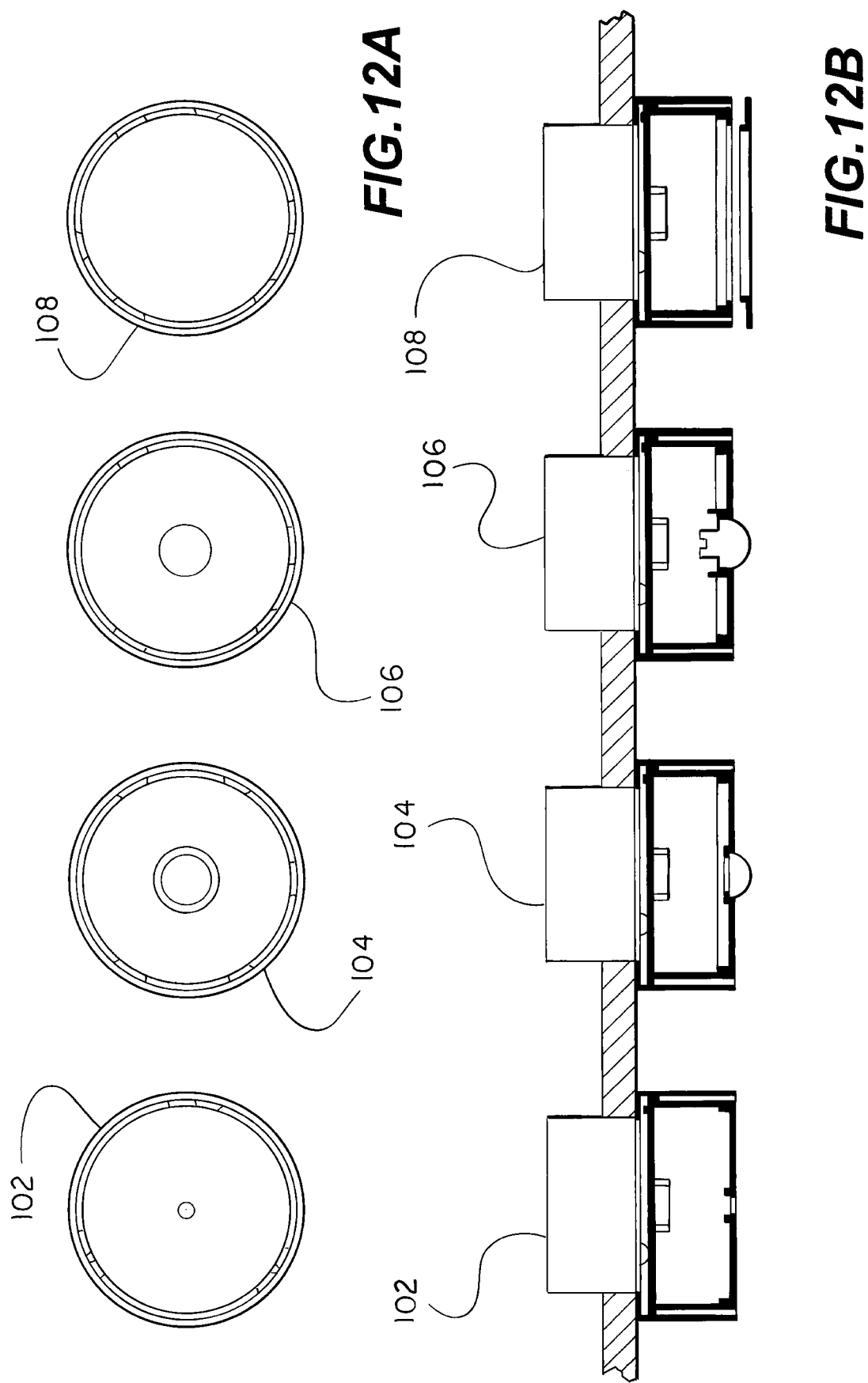

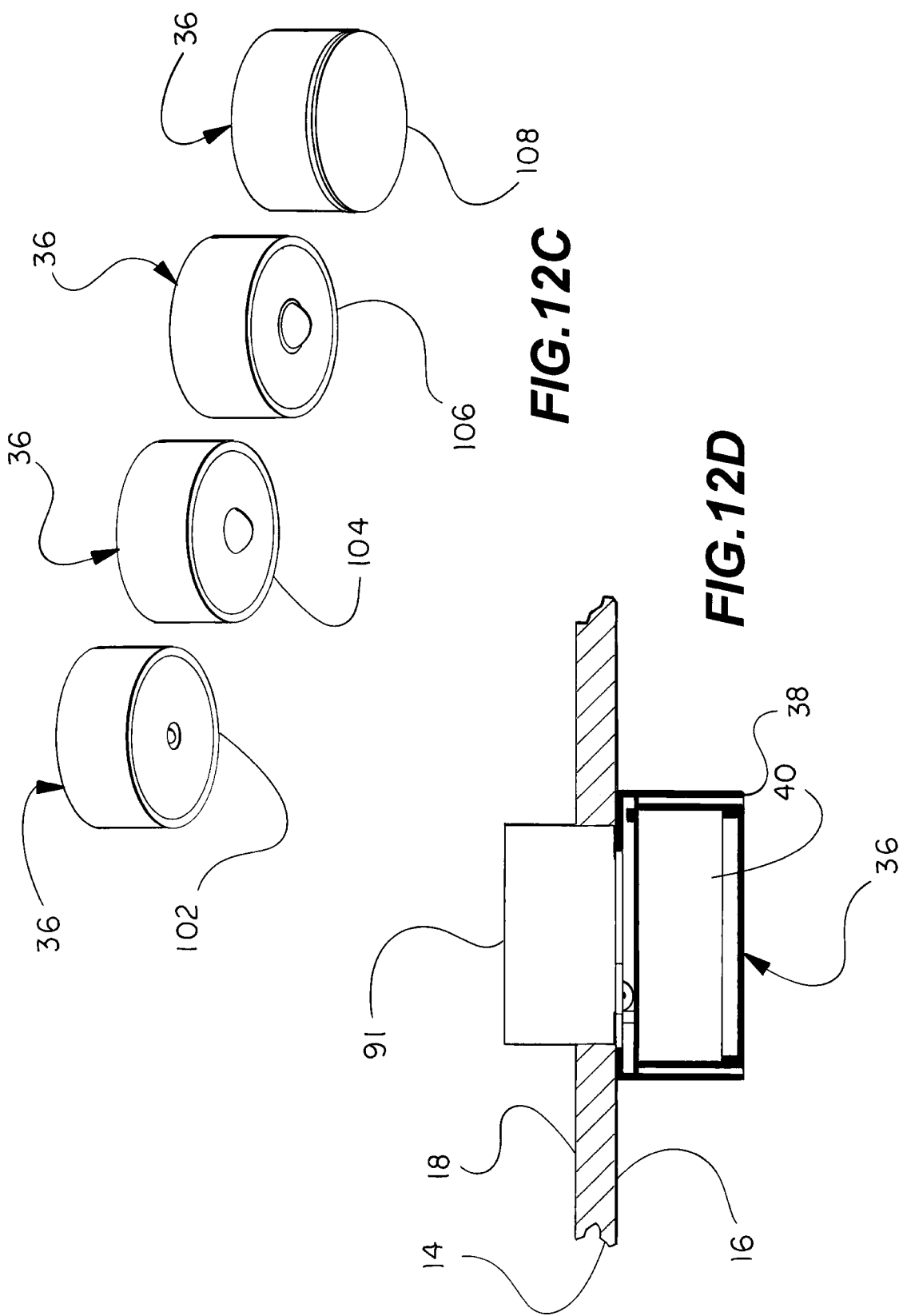

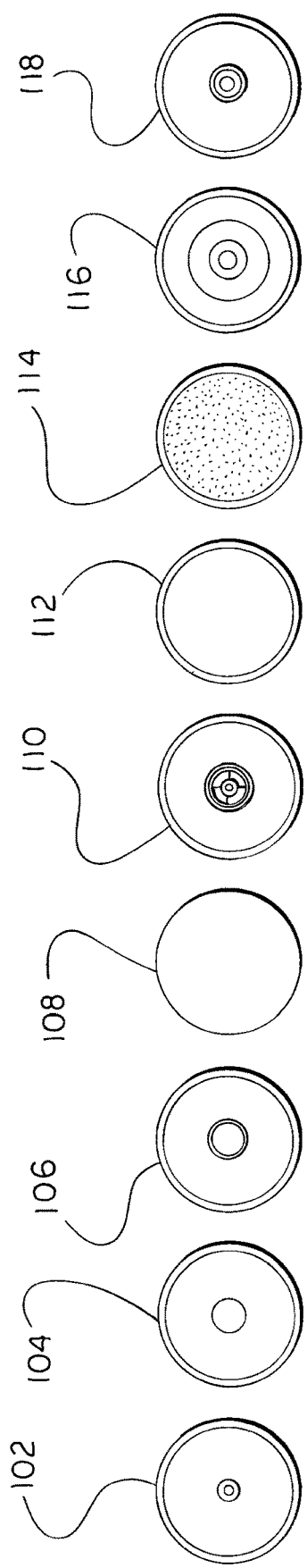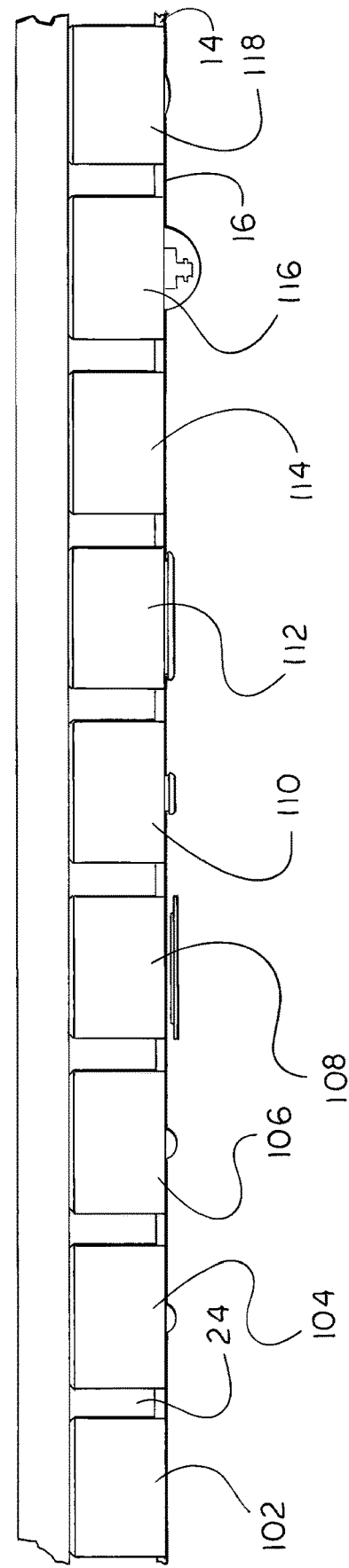

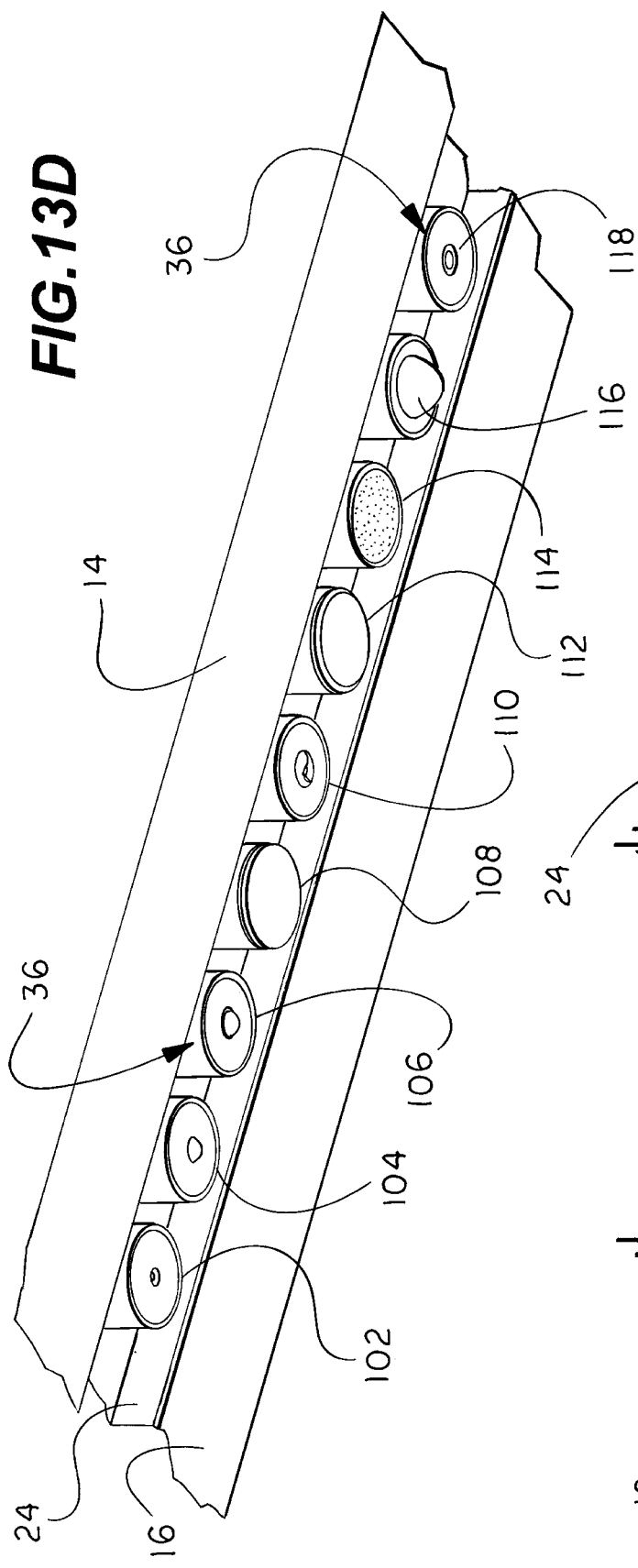
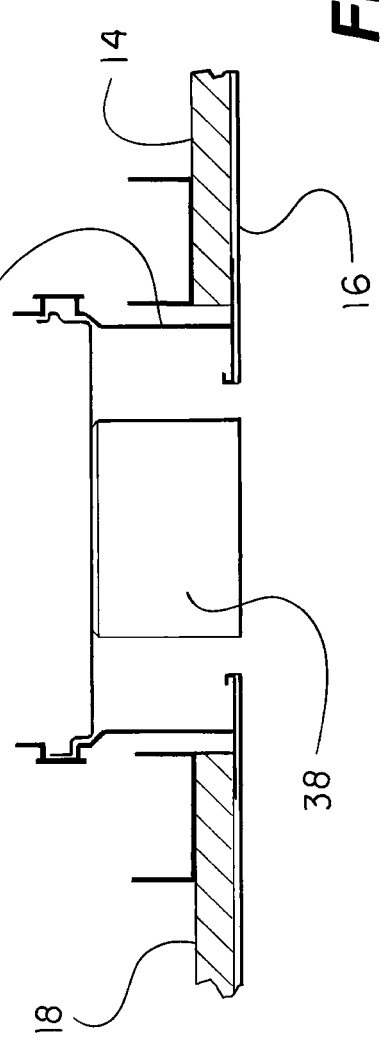

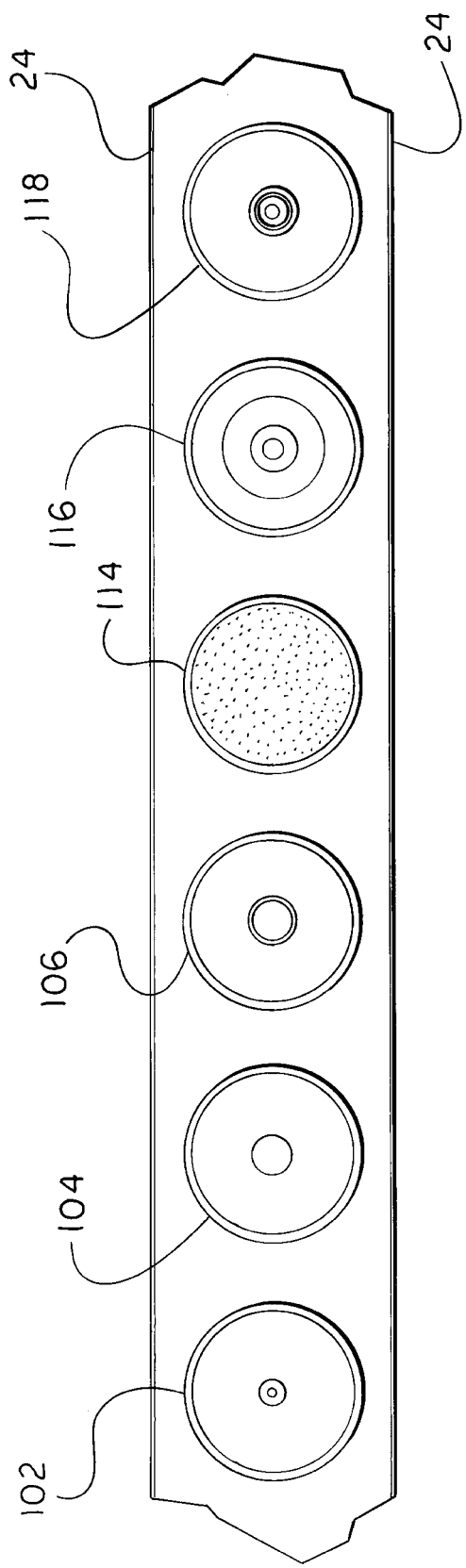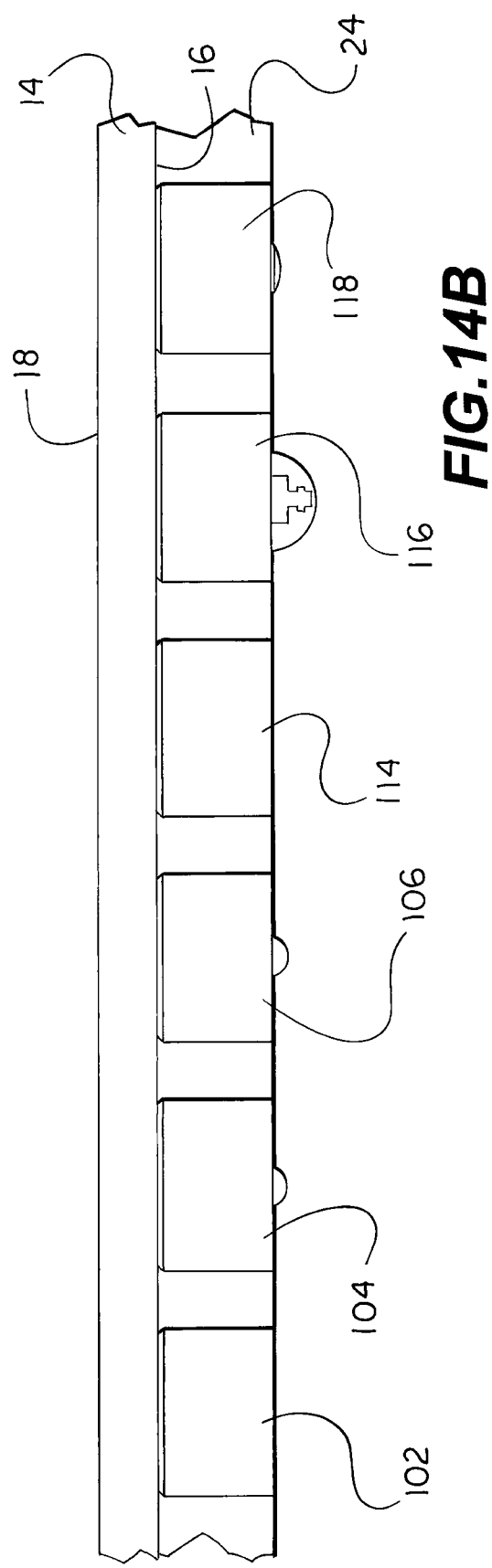

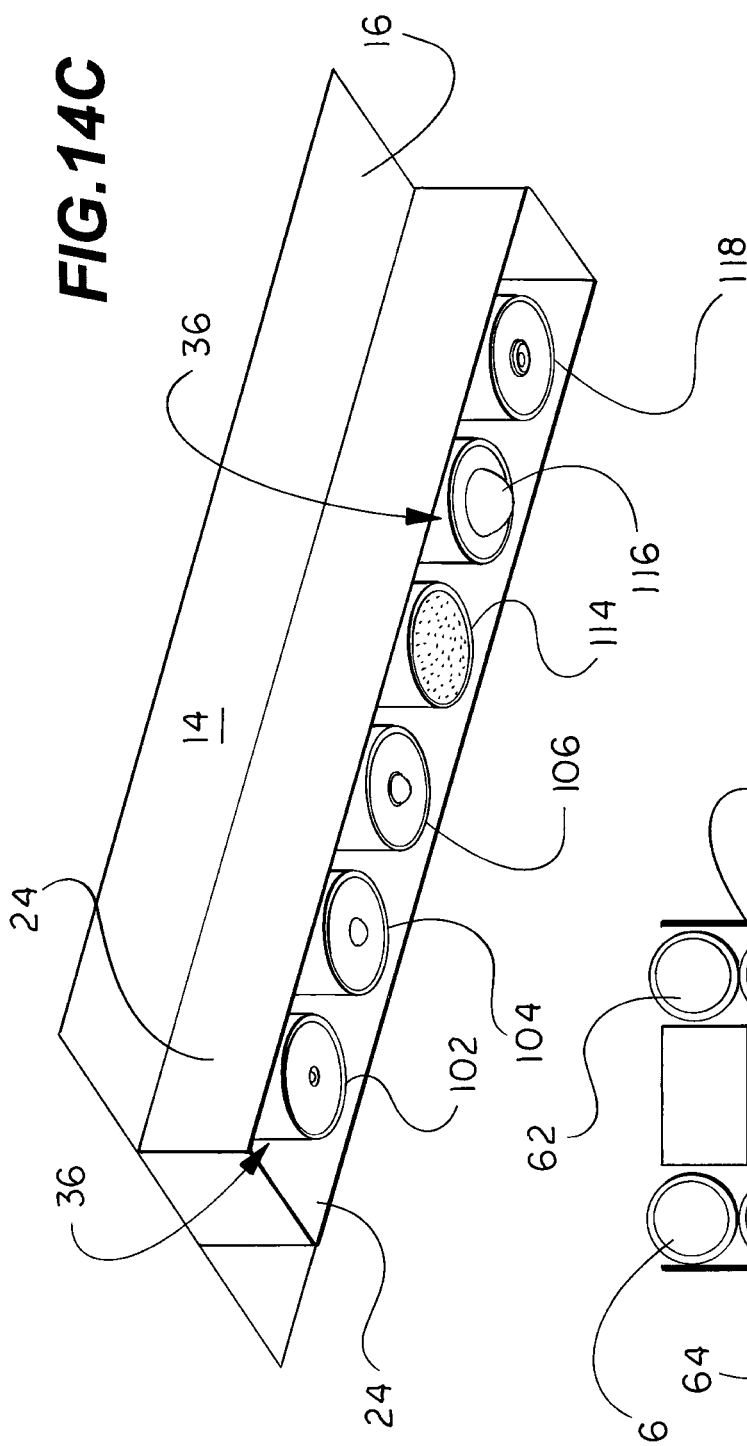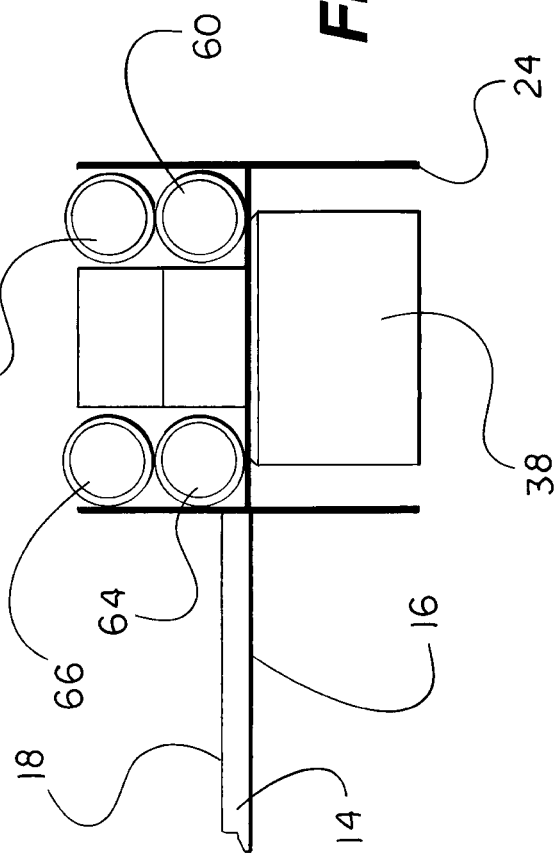

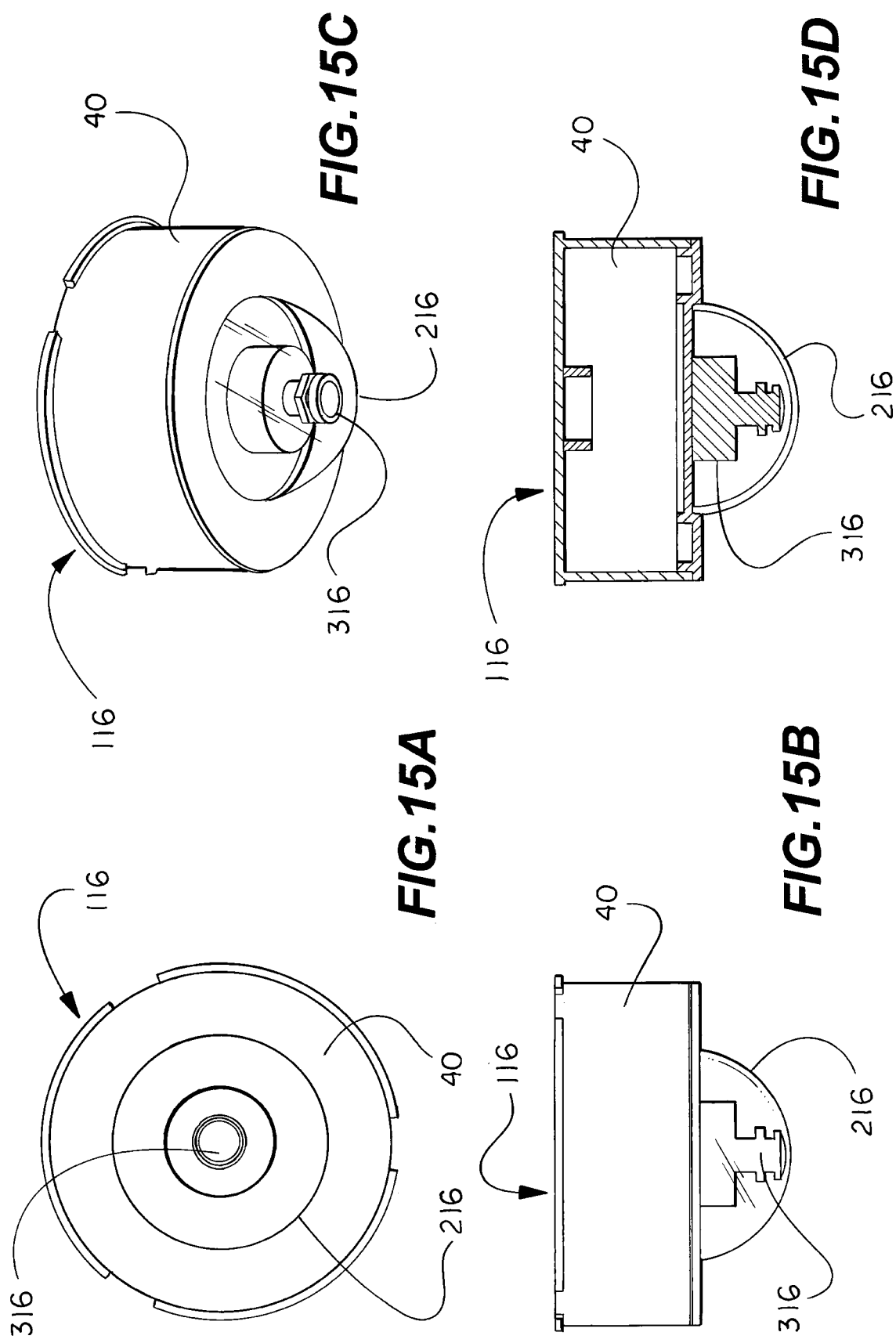

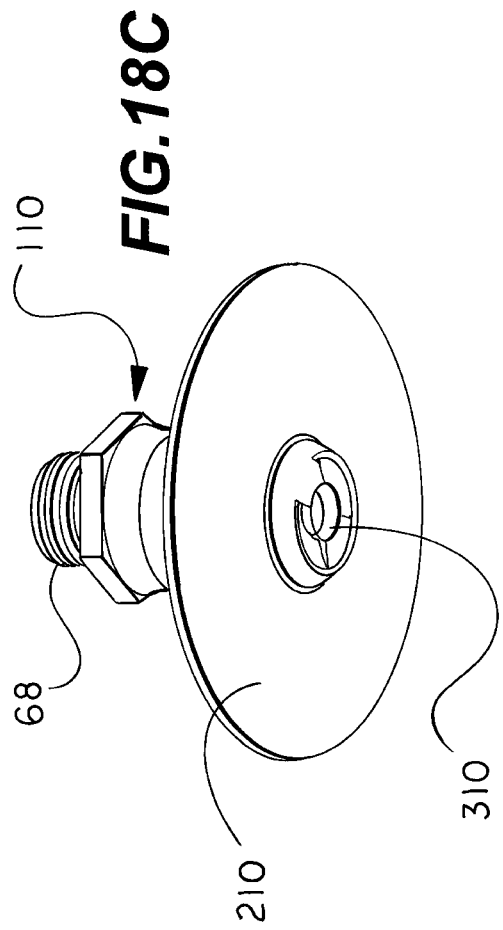
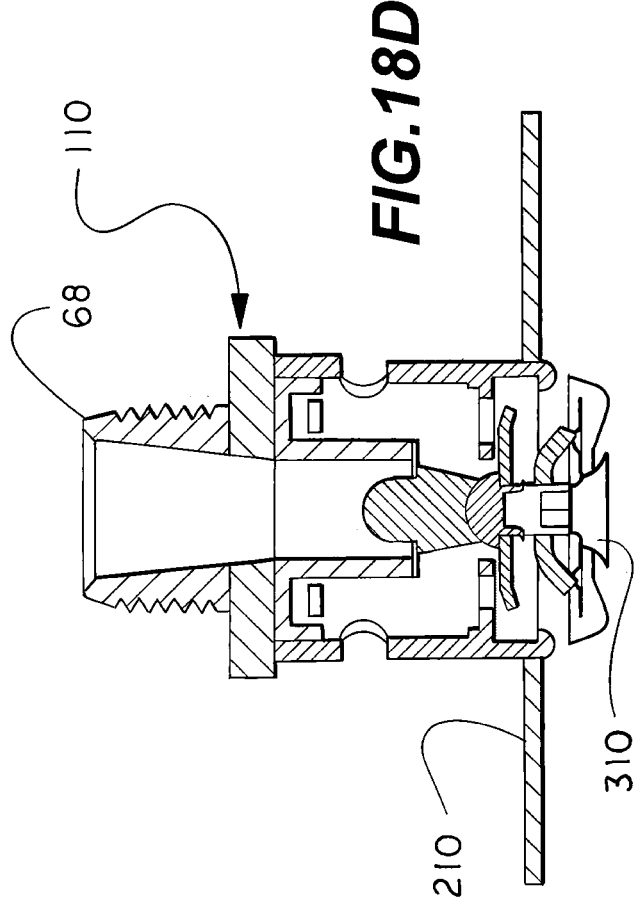
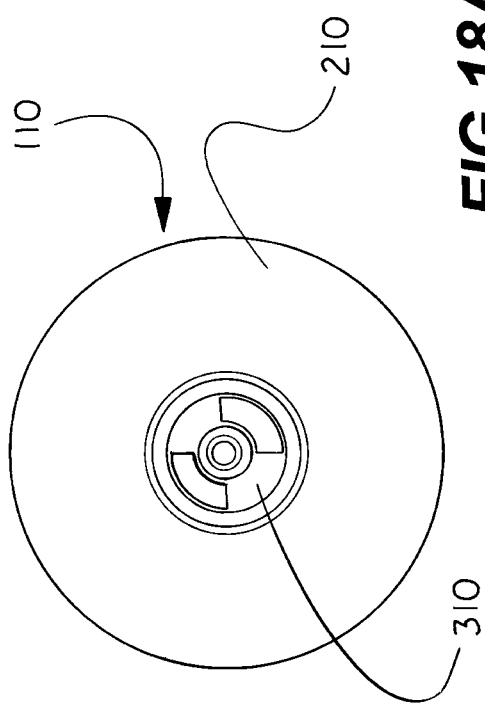
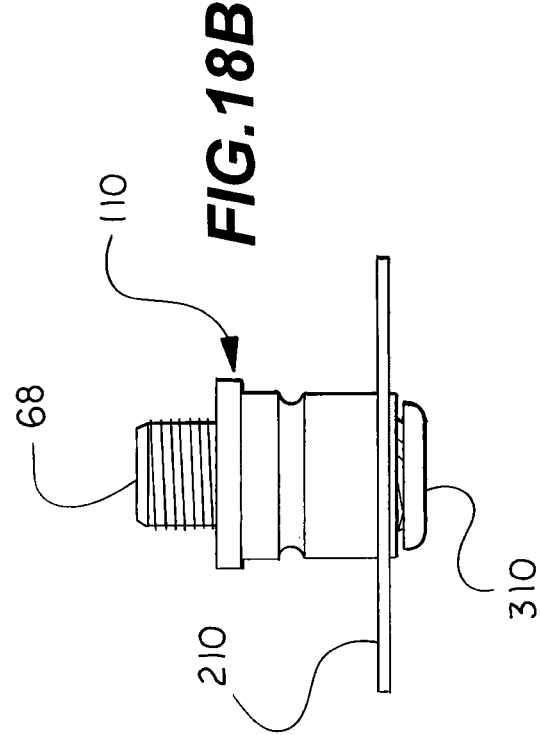

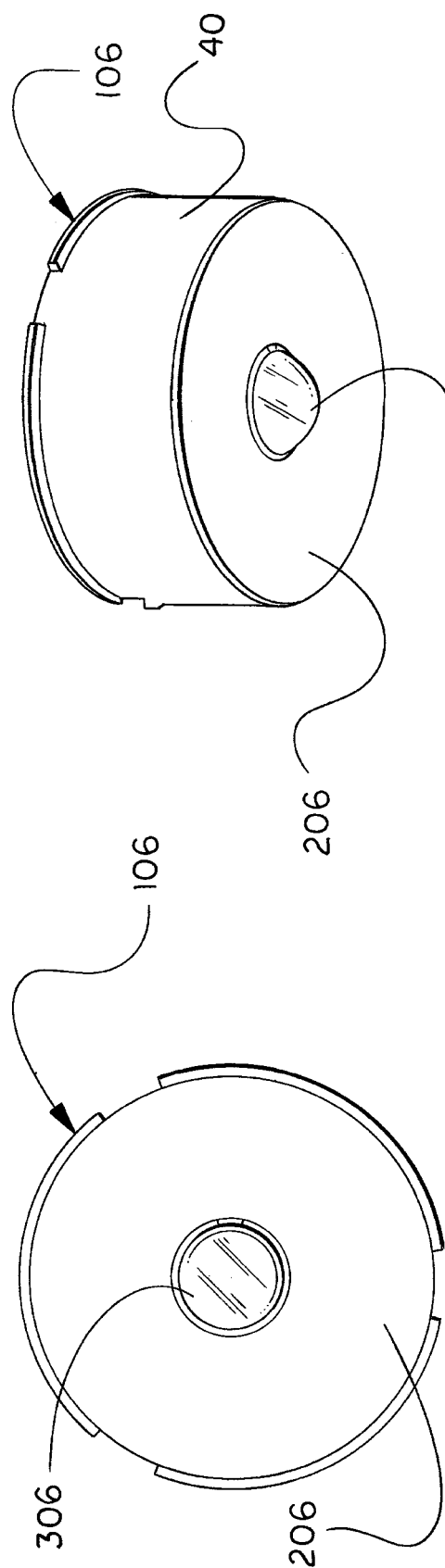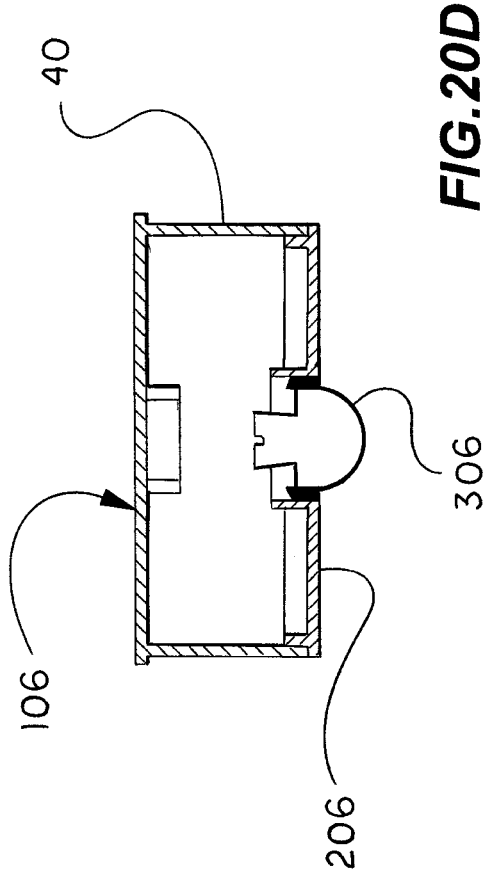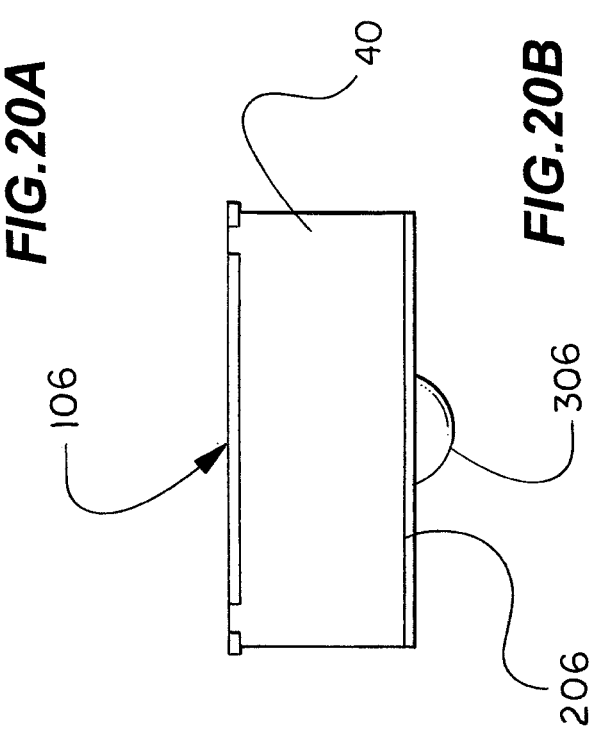

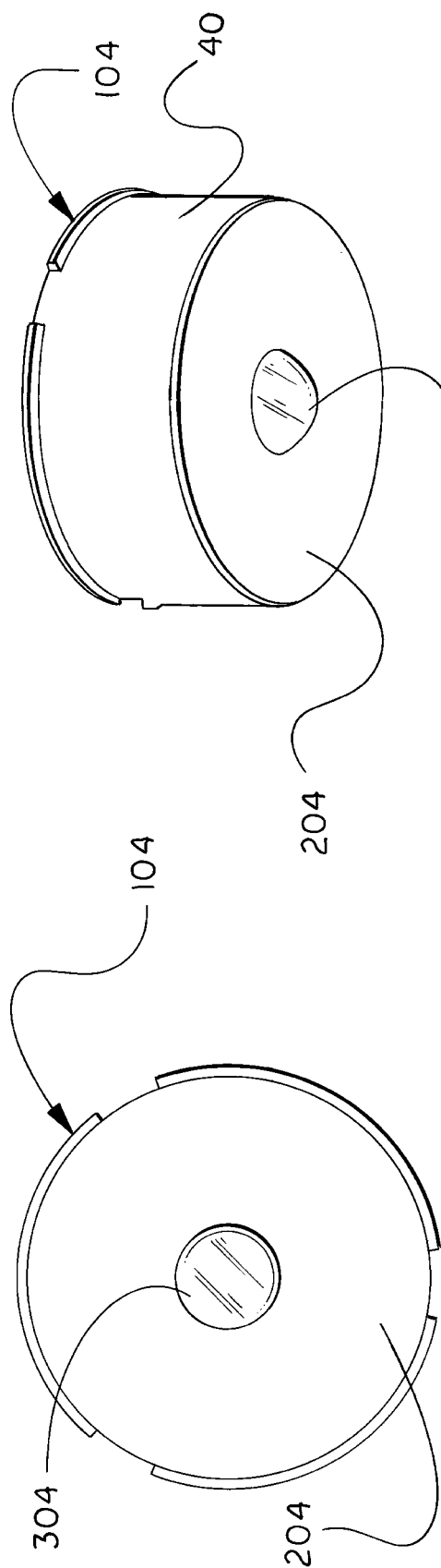
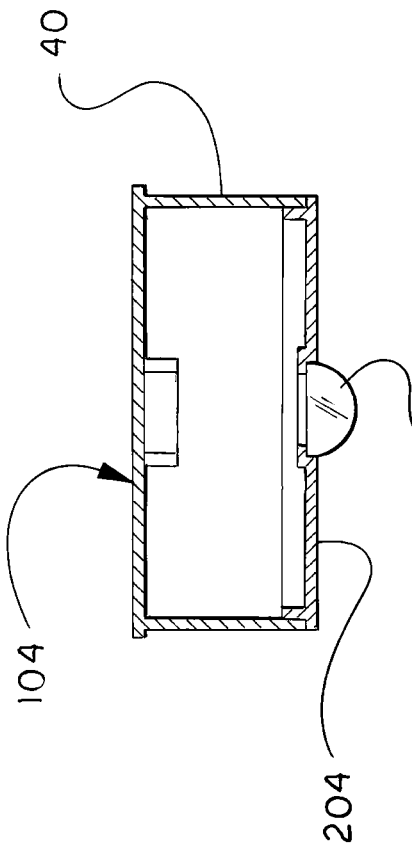
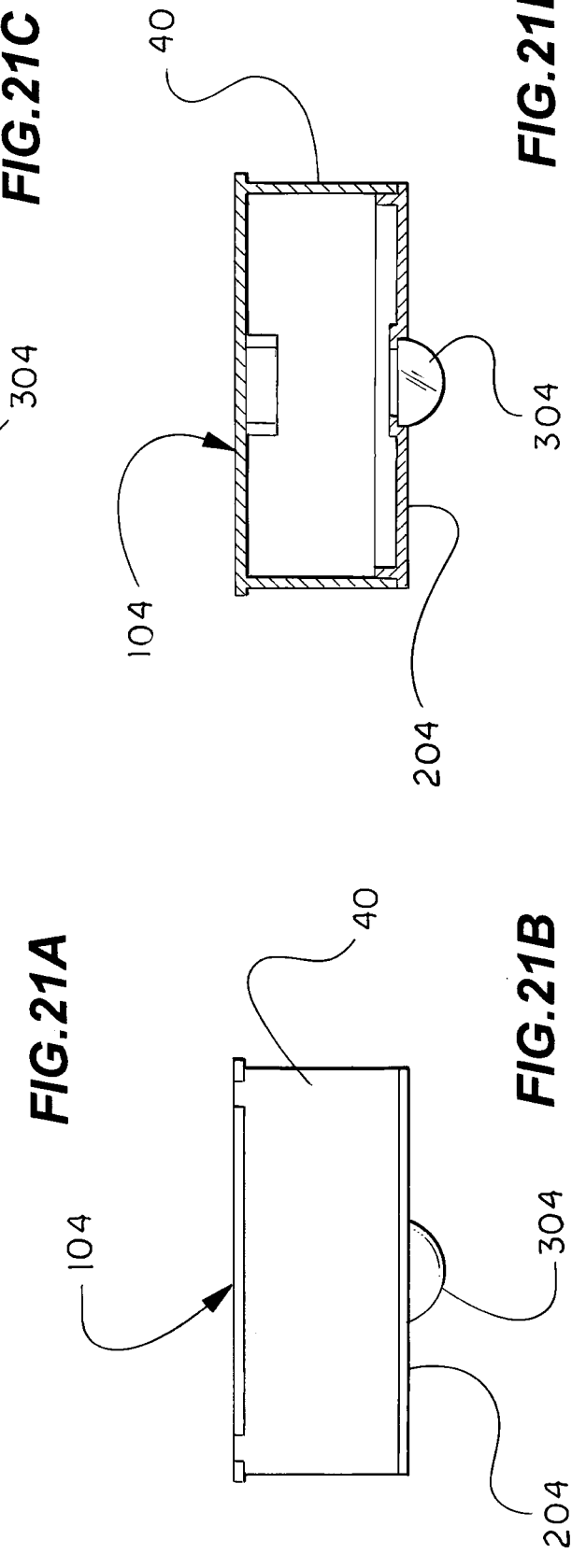

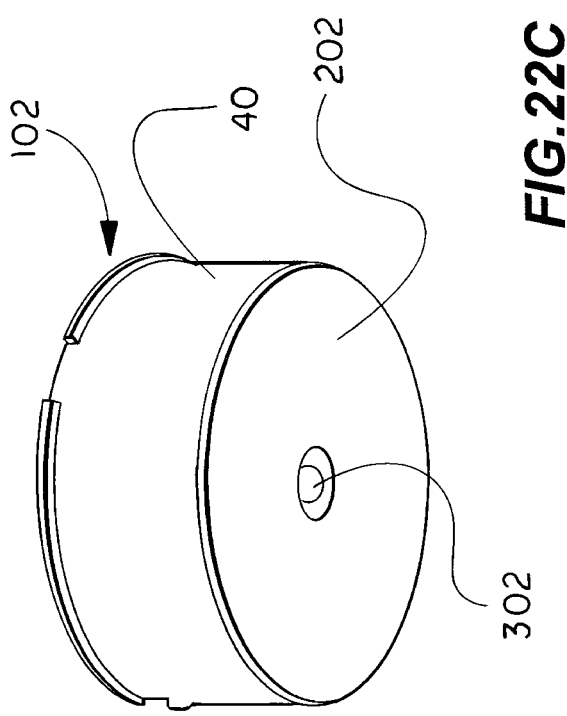
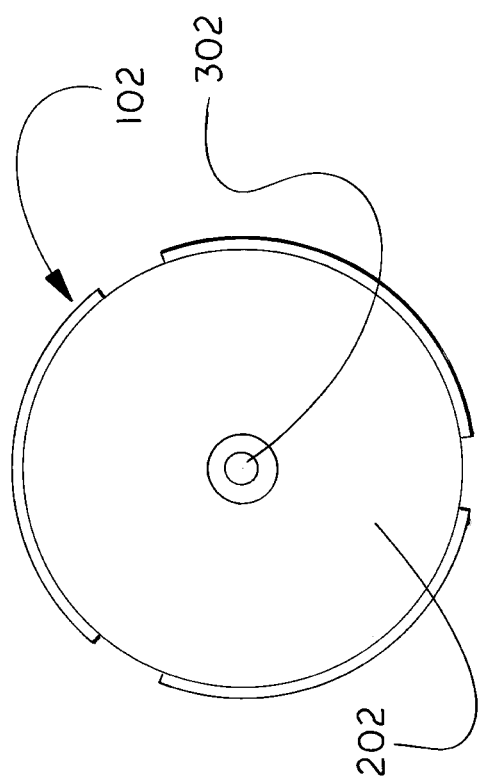
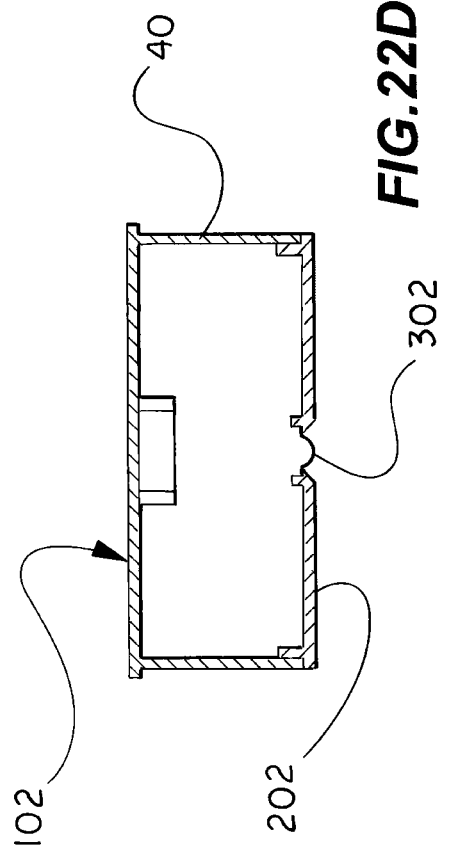
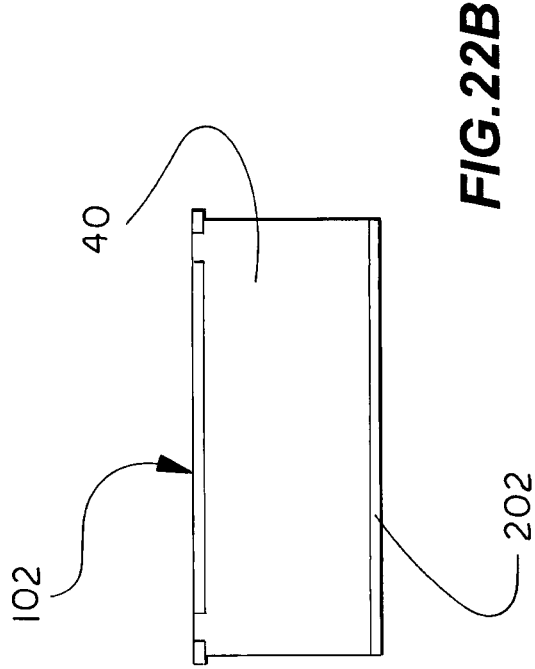

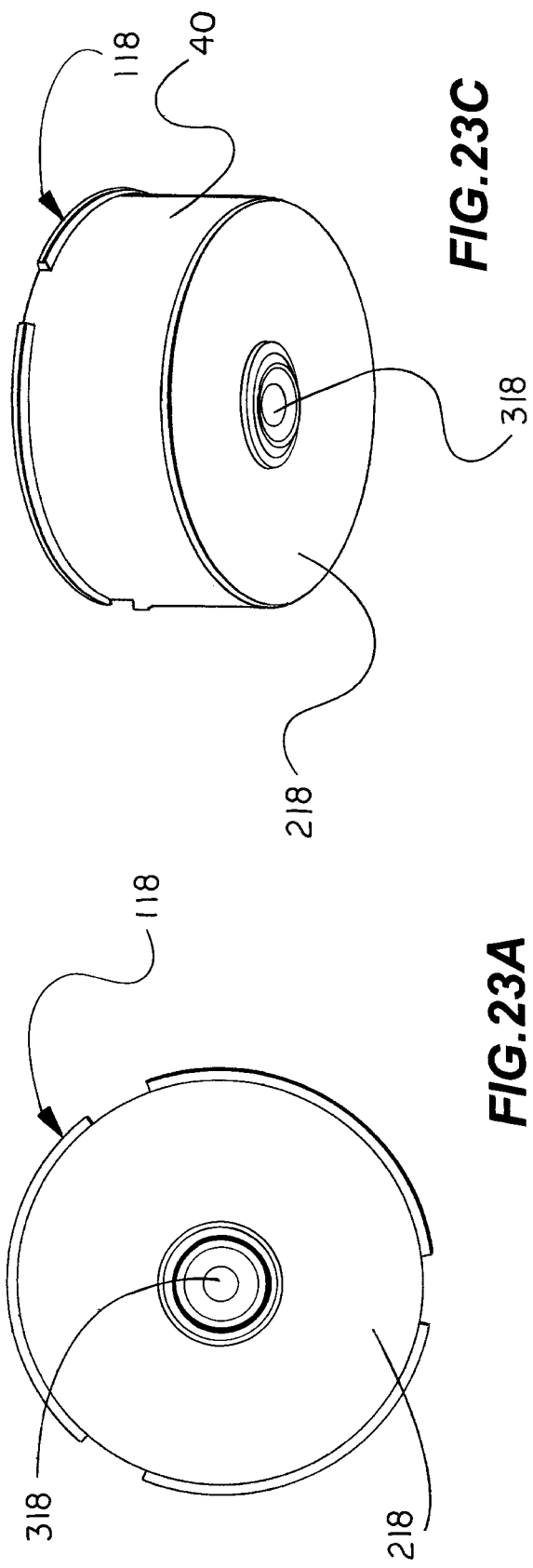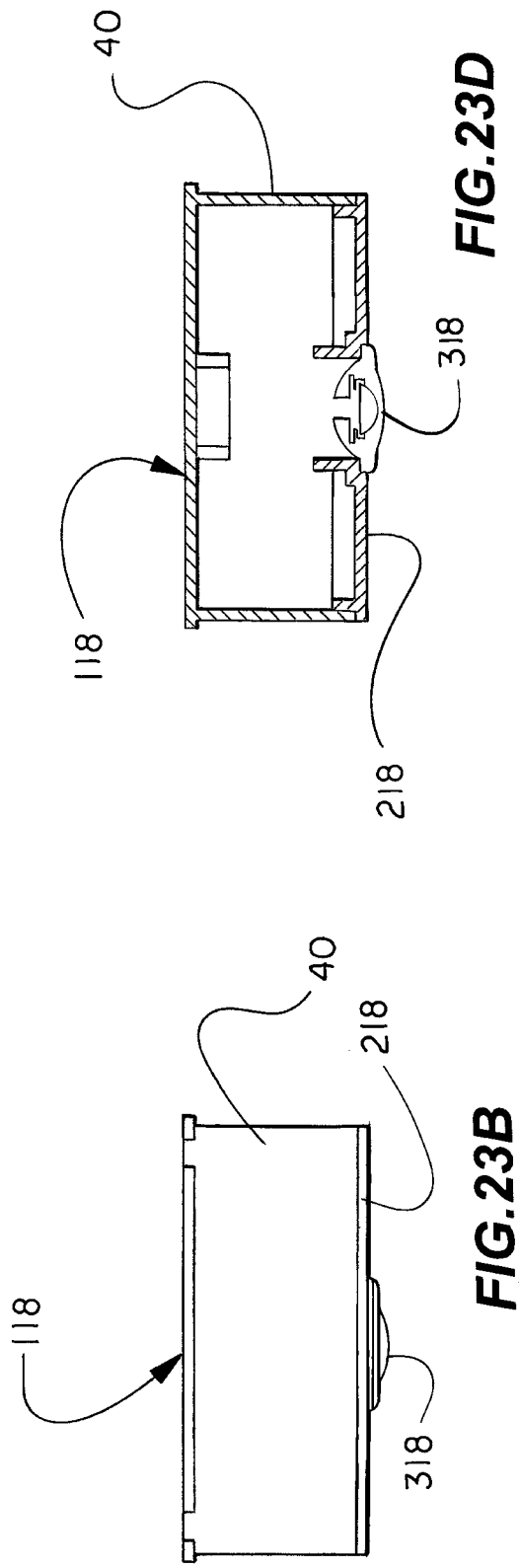

MODULAR CEILING SYSTEM

CROSS REFERENCE TO RELATED PATENT APPLICATIONS

This patent application claims priority from U.S. Provisional Patent Application No. 62/465,227, filed Mar. 1, 2017, which is hereby incorporated by reference.

FIELD OF THE INVENTION

This invention relates to a modular ceiling system, and more particularly to a modular ceiling system that accommodates a plurality of uniformly appearing devices that are integrated into a single control network.

BACKGROUND OF THE INVENTION

A typical prior art ceiling in a commercial building offers a platform for the installation of numerous devices including for example, room lights, emergency lights, cameras, speakers, sensors, Wifi access points (WAP), cell phone repeaters, sprinkler heads, drop-down signage, and HVAC grills. The sensors may include for example, light sensors, temperature sensors, smoke sensors, and occupancy/motion sensors.

The devices are often supplied from multiple sources and attached to multiple control systems. Consequently, the devices often are incompatible with each other and with other device control systems. Particularly, the devices may have different communication protocols and may not communicate with each other or with other control systems. The resulting prior art ceiling may include a redundancy of devices and infrastructure. Further, the prior art ceiling has poor flexibility thereby making upgrades difficult. Such a prior art ceiling with multiple incompatible devices require careful coordination between trades during design and installation resulting in additional time and cost. As a result, the aesthetic appearance of the prior art ceiling represents a hodgepodge of incompatible, non-uniform devices and a hodgepodge of multiple control systems.

Particularly, a typical prior art ceiling presents two distinct problems. First, the prior art ceiling is aesthetically unappealing because the devices are not uniform in appearance, and the installation of openings in the ceiling are not uniform in shape, size, and trim. While architects spend time addressing the aesthetic appearance of a building interior, the appearance of the ceiling is compromised when the contracting teams and consultants install numerous ceiling devices, none of which match in look or color. Second, the prior art ceiling lacks interoperation integration between and among devices and control systems.

SUMMARY OF THE INVENTION

The present invention addresses the problem associated with the prior art ceiling. The modular ceiling system of the present invention includes a range of devices similar in appearance. The devices may be installed in channels or frames that are designed to work with ceilings constructed of sheetrock, wood, metal, and others, materials. Alternatively, the devices may be surface mounted on a ceiling of any type. Further, the devices may be flush mounted on the ceiling.

When devices are installed in a channel, the system includes ceiling support structure that supports the channel which in turn supports an array of ceiling panels and the various devices, including without limitation, room lights, emergency lights, cameras, speakers, sensors, Wifi access points, cell phone repeaters, sprinkler heads, access tray, and HVAC grills. The access tray may accommodate overhead signage, a video screen, a Wi-Fi access point, or other electronic equipment. The channel is recessed in the ceiling so that the bottom edges of the channel are flush with the surrounding ceiling panels. Alternatively, the channel may be surface mounted and extending below the plane of the ceiling panels. The channel has uniformly sized and shaped openings that are arranged in an aesthetically pleasing pattern in coordination with the individual ceiling patterns or in an array of ceiling panels. Each of the openings in the channel is sized and shaped to accommodate one of the devices. Each of the devices includes a housing that is uniformly sized and shaped to fit into the uniformly sized and shaped openings in the channel. The housings of the devices are mounted in the openings of the channel so that the housings are either flush with the surrounding ceiling panels or are recessed within the channel from the surrounding ceiling panels. All of the housings for the devices are designed to have essentially the same shape, size, and color. Each individual device is contained within a separate case. Each case is sized and shaped to fit within the housings. Because the cases and housings are of the same size and shape, casings can be swapped between and among the housings thus allowing for easy reconfiguration of the devices in the ceiling. In addition, trim around each of uniformly sized and shaped openings also has a uniform shape, size, and color. Further, the channel of the modular ceiling system of the present invention accommodates conduits and the associated wiring for the distribution of power and data, piping for sprinkler heads, and ducts for HVAC grills.

Alternatively, the uniformly sized and shaped housings for the devices can be directly surface mounted on the ceiling panels without the use of the channel. When surface mounted, the uniformly sized and shaped devices are arranged in a pleasing geometry on the ceiling panels. Again, because the cases and housings are of the same size and shape, casings can be swapped between and among the housings thus allowing for easy reconfiguration of the devices on the ceiling.

A further alternative contemplates flush mounting the uniformly sized and shaped housings for the devices in the ceiling panels without the use of the channel. When flush mounted, the housings are mainly concealed above the ceiling panels with only the face of the devices visible to the room below.

Integration or interoperation of the devices is achieved by installing ceiling devices that have a common communication protocol so that a single building management system (BMS) network can manage all of the devices. A common communication protocol and single building management network will save on installation time, commissioning, and possibly in fewer devices overall. The network will add functionality to key devices, eliminate the need for two networks which are typical in construction (lighting and BMS), as well as simplify how devices communicate both with the building management system and with each other and how the devices are commissioned. The network and low voltage DC power are combined in the same category five (CAT5) cable to greatly reduce wiring and installation cost and complexity.

Further objects, features and advantages will become apparent upon consideration of the following detailed description of the invention when taken in conjunction with the drawings and the appended claims.

BRIEF DESCRIPTION OF THE DRAWINGS

FIG. 9A is an exploded perspective room side view of one of the devices mounted flush with the plane of the ceiling all in accordance with the present invention.

FIG. 9B is a plan room side view of one of the devices mounted flush with the plane of the ceiling all in accordance with the present invention.

FIG. 9C is a perspective room side view of one of the devices mounted flush with the plane of the ceiling all in accordance with the present invention.

FIG. 9D is side elevation section view of one of the devices mounted flush with the plane of the ceiling all in accordance with the present invention.

FIG. 10A is an exploded perspective room side view of one of the devices surface mounted and extending below the plane of the ceiling all in accordance with the present invention.

FIG. 10B is a plan room side view of one of the devices surface mounted and extending below the plane of the ceiling all in accordance with the present invention.

FIG. 10C is a perspective room side view of one of the devices surface mounted and extending below the plane of the ceiling all in accordance with the present invention.

FIG. 10D is a side elevation section view of one of the devices surface mounted and extending below the plane of the ceiling all in accordance with the present invention.

FIG. 11A is a plan room side view of several of the devices mounted flush in the ceiling all in accordance with the present invention.

FIG. 11C is a side elevation section view of several of the devices mounted flush in the ceiling all in accordance with the present invention.

FIG. 11E is a perspective room side view of several of the devices mounted flush in the ceiling all in accordance with the present invention.

FIG. 11F is a side elevation section view of one of the devices surface mounted flush in the ceiling all in accordance with the present invention.

FIG. 12A is a plan room side of several of the devices surface mounted in the ceiling all in accordance with the present invention.

FIG. 12B is a side elevation section view of several of the devices surface mounted in the ceiling all in accordance with the present invention.

FIG. 12C is a perspective room side view of several of the devices surface mounted in the ceiling all in accordance with the present invention.

FIG. 12D is a side elevation section view of one of the devices surface mounted in the ceiling all in accordance with the present invention.

FIG. 13A is a plan room side view of several of the devices mounted in a channel that is in turn flush mounted in the ceiling all in accordance with the present invention.

FIG. 13B is a side elevation view of several of the devices mounted in the channel (with the front face of the channel removed for clarity) that is in turn flush mounted in the ceiling all in accordance with the present invention.

FIG. 13C is a perspective room side view of several of the devices mounted in the channel that is in turn flush mounted in the ceiling all in accordance with the present invention.

FIG. 13D is a side elevation section view of several of the devices mounted in the channel that is in turn flush mounted in the ceiling all in accordance with the present invention.

FIG. 14A is a plan room side view of several of the devices mounted in a channel that is in turn surface mounted on the ceiling all in accordance with the present invention.

FIG. 14B is a side elevation view of several of the devices mounted in the channel (with the front face of the channel removed for clarity) that is in turn surface mounted on the ceiling all in accordance with the present invention.

FIG. 14C is a perspective room side view of several of the devices mounted in the channel that is in turn surface mounted on the ceiling all in accordance with the present invention.

FIG. 14D is a side elevation section view of several of the devices mounted in the channel that is in turn surface mounted on the ceiling all in accordance with the present invention.

FIG. 15A is a plan room side view of the camera device in accordance with the present invention.

FIG. 15B is a side elevation view of the camera device in accordance with the present invention.

FIG. 15C is a perspective room side view of the camera device in accordance with the present invention.

FIG. 15D is a side elevation section view of the camera device in accordance with the present invention.

FIG. 18A is a plan room side view of the broadcast sprinkler device in accordance with the present invention.

FIG. 18B is a side elevation view of the broadcast sprinkler device in accordance with the present invention.

FIG. 18C is a perspective room side view of the broadcast sprinkler device in accordance with the present invention.

FIG. 18D is a side elevation section view of the broadcast sprinkler device in accordance with the present invention.

FIG. 20A is a plan room side view of the motion sensor device in accordance with the present invention.

FIG. 20B is a side elevation view of the motion sensor device in accordance with the present invention.

FIG. 20C is a perspective room side view of the motion sensor device in accordance with the present invention.

FIG. 20D is a side elevation section view of the motion sensor device in accordance with the present invention.

FIG. 21A is a plan room side view of the strobe device in accordance with the present invention.

FIG. 21B is a side elevation view of the strobe device in accordance with the present invention.

FIG. 21C is a perspective room side view of the strobe device in accordance with the present invention.

FIG. 21D is a side elevation section view of the strobe device in accordance with the present invention.

FIG. 22A is a plan room side view of the emergency light device in accordance with the present invention.

FIG. 22B is a side elevation view of the emergency light device in accordance with the present invention.

FIG. 22C is a perspective room side view of the emergency light device in accordance with the present invention.

FIG. 22D is a side elevation section view of the emergency light device in accordance with the present invention.

FIG. 23A is a plan room side view of the panoramic security camera device in accordance with the present invention.

FIG. 23B is a side elevation view of the panoramic security camera device in accordance with the present invention.

FIG. 23C is a perspective room side view of the panoramic security camera device in accordance with the present invention.

FIG. 23D is a side elevation section view of the panoramic security camera device in accordance with the present invention.

DETAILED DESCRIPTION OF THE PREFERRED EMBODIMENTS

Figure 1:
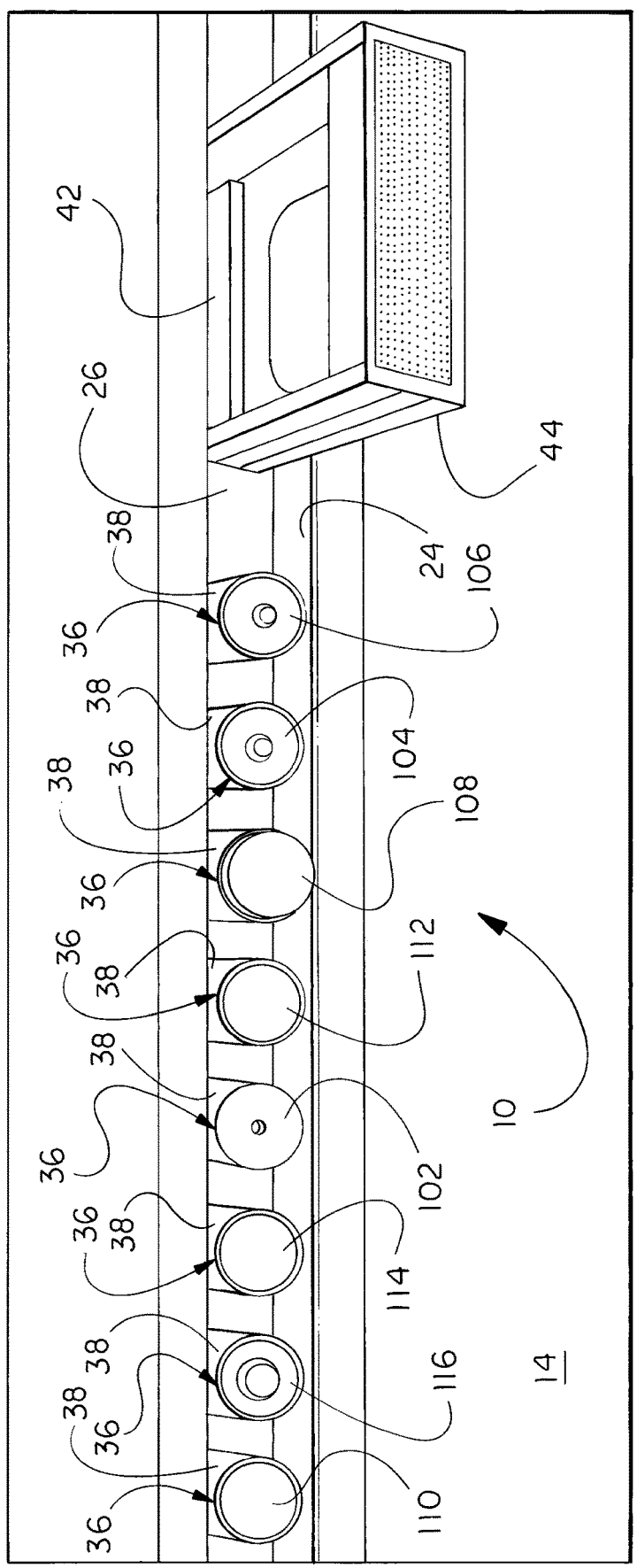
FIG. 1 is a bottom, room side perspective view of a modular ceiling system with a flush mounted channel for supporting devices including an extended access tray all in accordance with the present invention.
Figure 2:
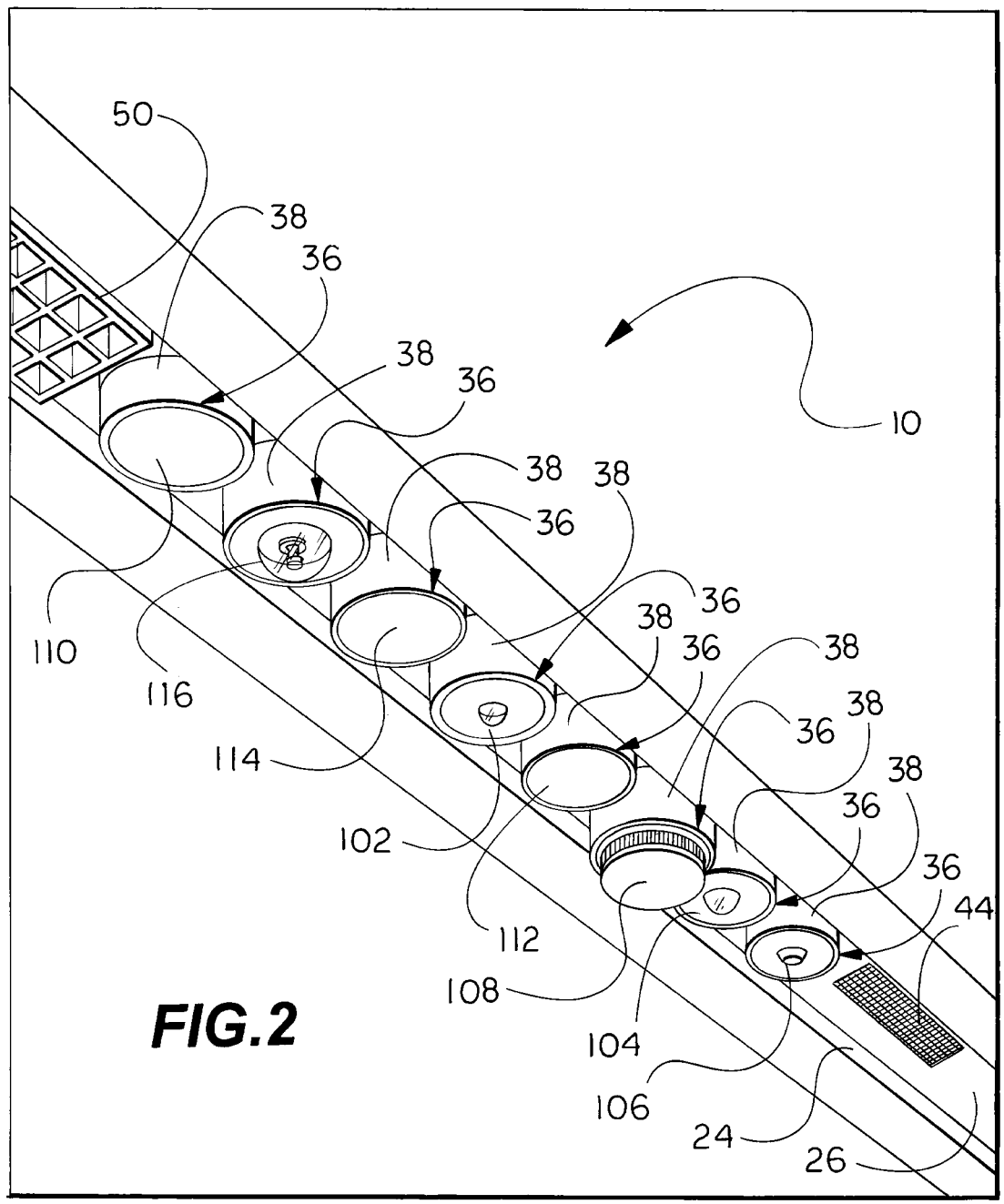
FIG. 2 is a bottom, room side perspective view of the modular ceiling system with the flush mounted channel for supporting the devices including the access tray retracted all in accordance with the present invention.
Figure 3:
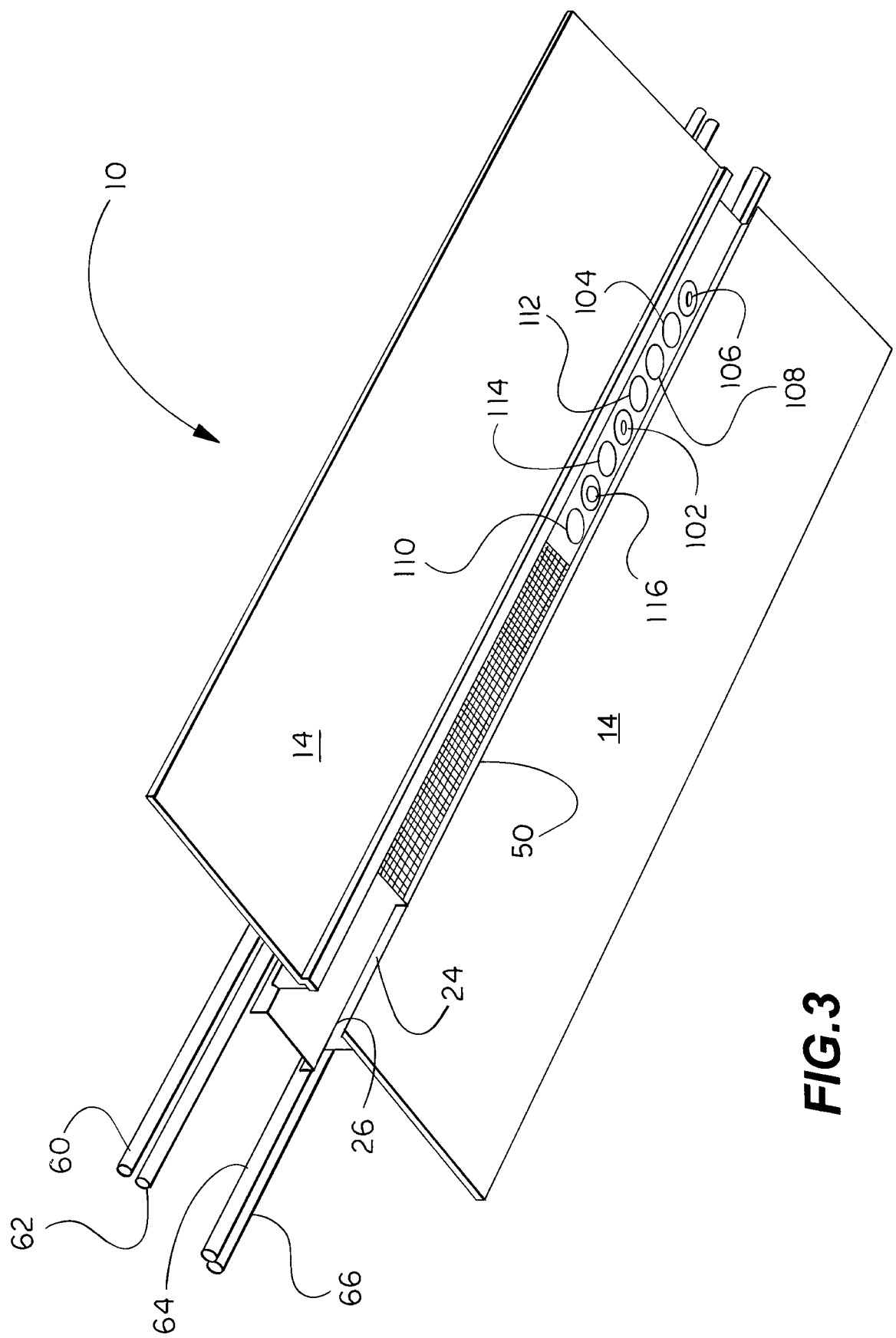
FIG. 3 is a bottom, room side perspective view of the modular ceiling system with the flush mounted channel for supporting the devices, an HVAC grill, and the access tray all in accordance with the present invention.

With reference to FIGS. 1-7 and 13-14, a modular ceiling system 10 includes a ceiling support structure 12 (FIGS. 6 and 7) that supports rails 54 extend along a length of the ceiling. The rails 54 in turn support ceiling panels 14 by means of flanges 56. The rails 54 also support a channel 24 extending along a length of the ceiling. The channel 24 has a series of uniformly sized and shaped openings 30 (FIG. 5) in which uniformly sized and shaped devices 36 are fitted. The uniformly sized and shaped devices 36 include uniformly sized and shaped housings 38 that are fitted into the openings 30. The housings 38 support uniformly sized and shaped cases 40 for each of the devices 36. With reference to the FIG. 1 such devices 36 include for example emergency lighting 102, strobe light 104, environmental sensors 106, smoke detector 108, broadcast sprinkler 110, concealed sprinkler 112, speaker 114, security camera 116, and panoramic camera 118.

Because the openings 30 in the channel 24 are uniformly sized and shaped, the housings 38 of the devices 36 are necessarily uniformly sized and shaped for accommodation in the openings 30. Each of the openings 30 may have trim on the room side 26 of the channel 24. In order to assure uniformity of appearance, the trim for each of the uniformly sized and shaped openings 30 is likewise uniform in size, shape, and appearance.

Figure 4:
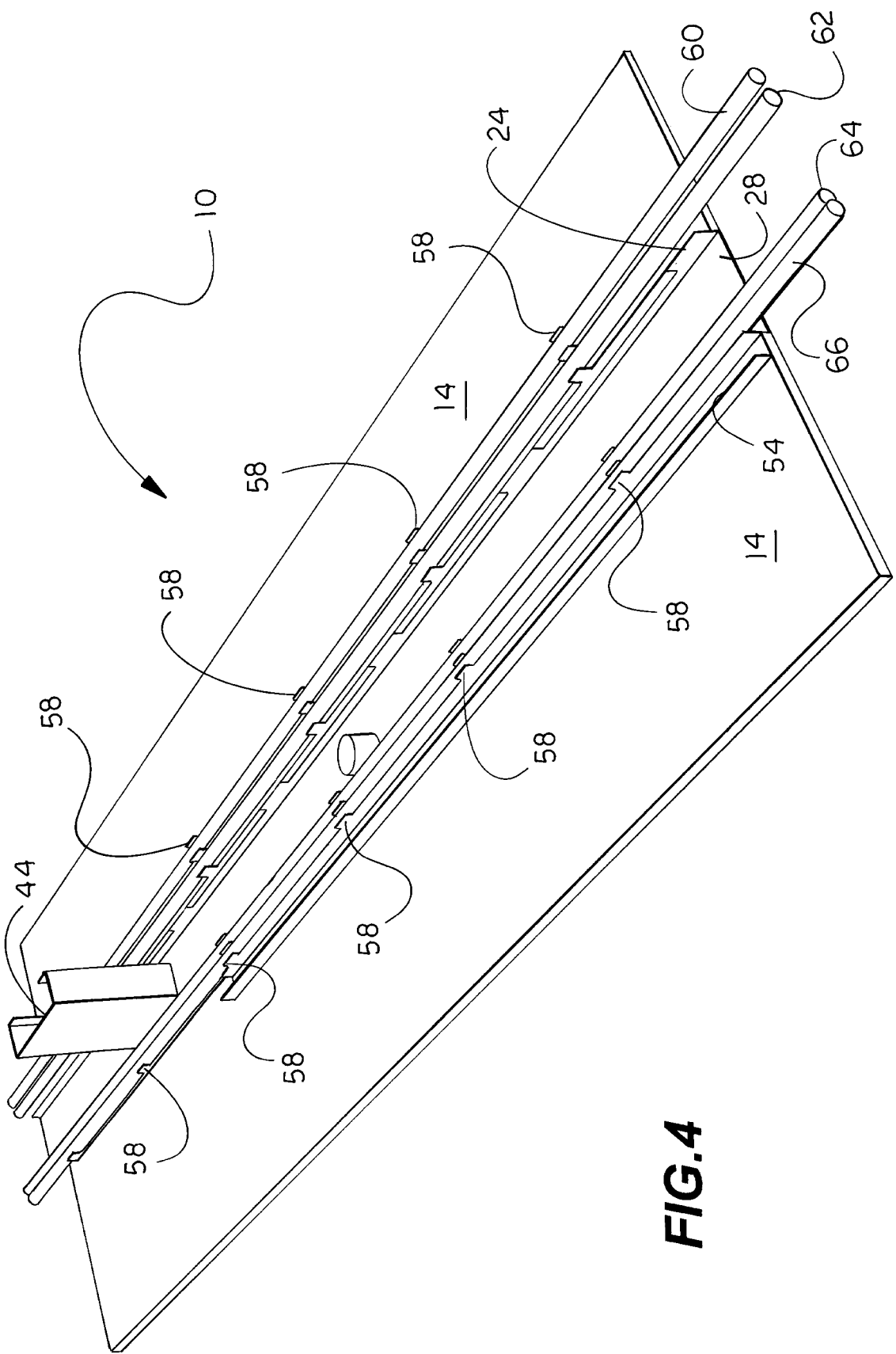
FIG. 4 is a back side perspective view of the modular ceiling system with the flush mounted channel for supporting the devices including the retracted access tray all in accordance with the present invention.
Figure 5:
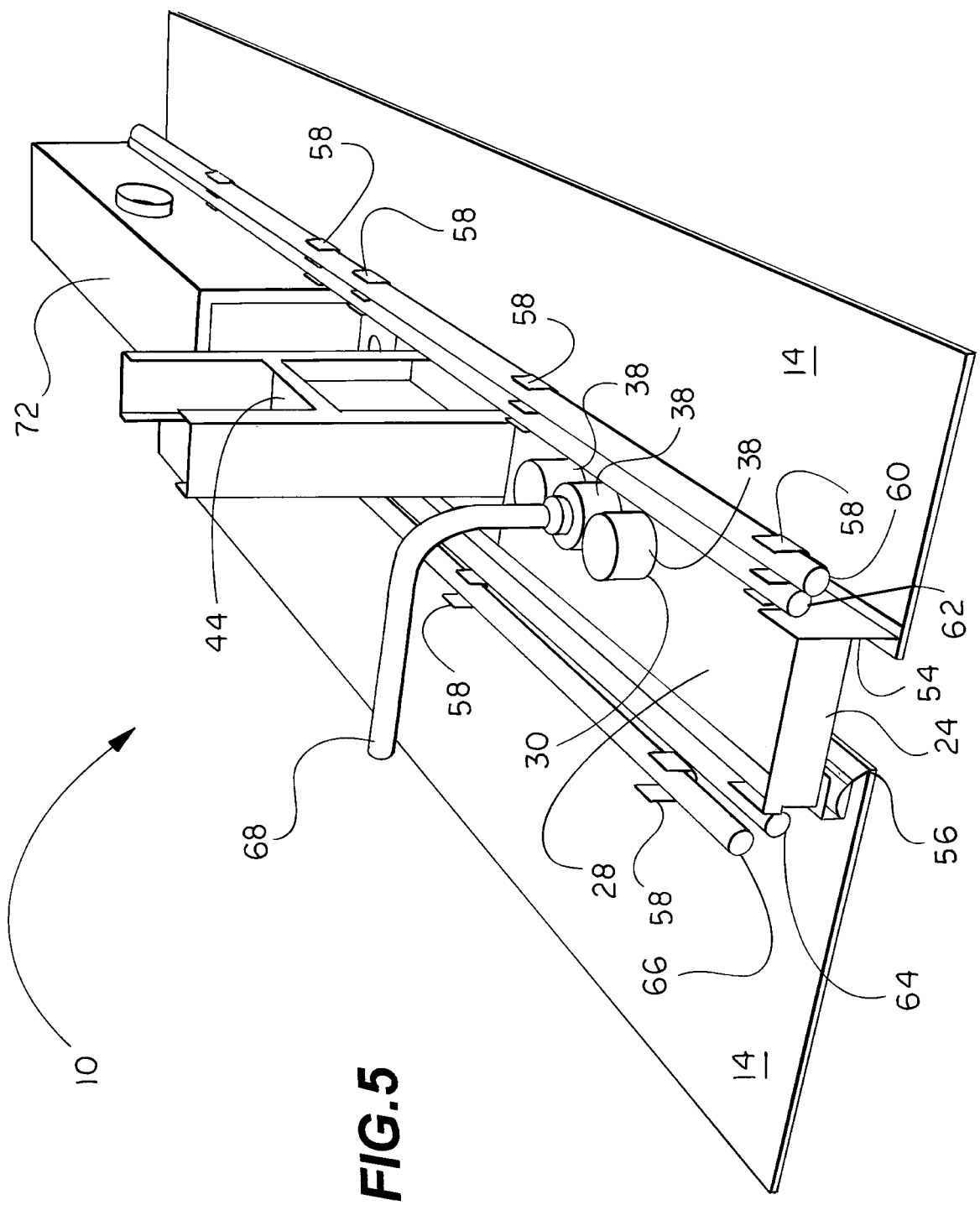
FIG. 5 is a back side perspective view of the modular ceiling system with the flush mounted channel for supporting the devices, the HVAC unit, and the retracted access tray all in accordance with the present invention.
Figure 6:
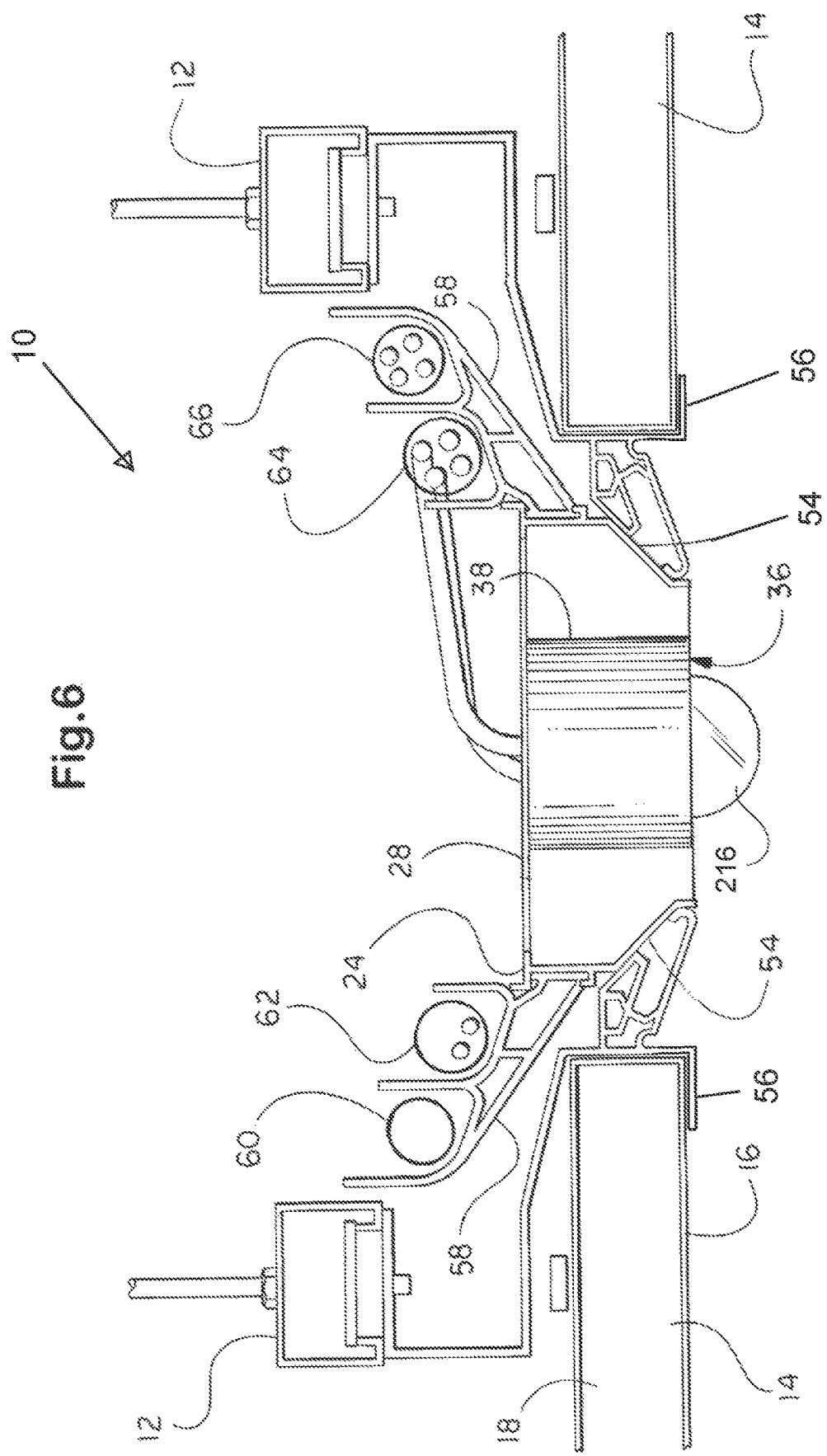
FIG. 6 is a side elevation section view of the modular ceiling system with the flush mounted channel for supporting a housing of a device (camera) flush with the ceiling all in accordance with the present invention.
Figure 7:
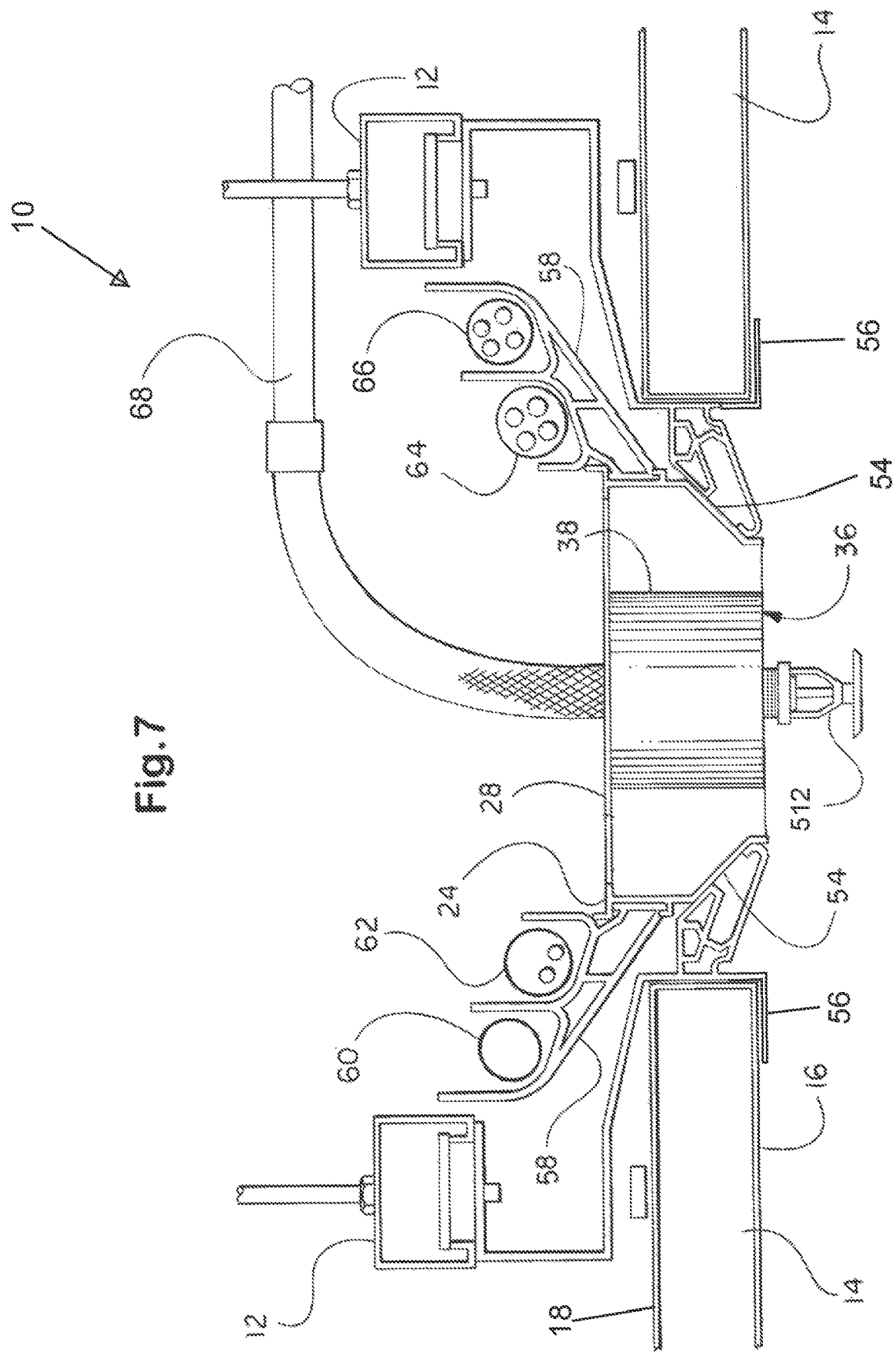
FIG. 7 is a side elevation section view of the modular ceiling system with the flush mounted channel for supporting the housing of a device (sprinkler) flush with the ceiling all in accordance with the present invention.

With continued reference to FIGS. 1-7, the ceiling panels 14 have a front, room side 16 and a back side 18 (FIGS. 6 and 7). The channel 24 has a planar front side 26 (FIG. 1) and a planar back side 28 (FIG. 4). The plane of the front side 26 of the channel 24 may be recessed from the plane of the front side 16 of the ceiling panels 14 as shown in FIGS. 1 2, 3, 6, 7, and 13B-13D. Alternatively, the channel 24 may be surface mounted on the ceiling so that the plane of the front side 26 of the channel 24 is flush with the plane of the front side 16 of the ceiling panels 14 as illustrated in FIGS. 4 and 14B-14D. In a further alternative, the housings 38 for the devices 36 may be flush or semi-flush mounted in openings 30 in the channel 24.

In addition to the uniformly sized and shaped openings 30 with uniform sized and shaped housings 38, the channel 24 also has a tray opening 42 that accommodates a drop-down tray 44. The drop-down tray 44 serves several purposes including a location for access to functional components of the modular ceiling system, a video monitor, or lighted signage. FIG. 1 shows the drop-down tray 44 in the extended position, and FIG. 5 shows the drop-down tray in the retracted position. In addition, the channel 24 has an HVAC opening to accommodate an HVAC grill 50 (FIG. 2) extending along a portion of the length of the channel 24. The HVAC unit 72 (FIG. 5) is supported by the channel 24 and delivers conditioned air to the HVAC grill 50 fitted into an opening in the channel 24.

FIG. 5 shows the details of the back side 28 of channel 24. The backside 28 of the channel 24 provides support for cables, piping, and ducts. Particularly, the backside 28 of the channel 24 has a set of rails 54 running lengthwise along opposite sides of the channel 24. The rails 54 include flanges 56 on either side that support the ceiling panels 14. In addition, the rails 54 have a series of support clips 58 extending along the length of the rails 54. In one embodiment, the support clips 58 support four wire conduits including life and safety conduit 62, high voltage conduit 66, low voltage conduit 64, and backup/expansion conduit 60. The life and safety conduit 62 houses the wiring for smoke and fire detectors, sprinkler control, and emergency lighting. The separate life and safety conduit 62 ensures that emergency systems operate in the absence of power and control signals unrelated to emergencies. The high voltage conduit houses the power cables for ordinary lighting, distributed HVAC units, electric service outlets, and distributed network control modules. The low voltage conduit 64 houses wiring for communication with the devices and wiring for other communications, such as telephone and computer wiring. The backup/expansion conduit 60 provides housing for wiring that may be required for future enhancements of the modular ceiling system 10 and for replacement wires if one or more wires in the other conduits fail.

A sprinkler system supply pipe 68 is shown in FIGS. 5 and 7. The supply pipe 68 is connected to sprinkler head 112. When activated, the concealed sprinkler head unit 512 extends from the housing 38 as illustrated in FIG. 7.

FIGS. 13A-D and FIGS. 14F-D show channel mounted devices 36. FIGS. 13A-D show the channel 24 flush mounted with respect to the plane of the front surface 16 of the ceiling panels 14, and FIGS. 14F-D show the channel surface mounted and protruding below the plane of the front surface 16 of the ceiling panels 14. Particularly, FIGS. 13A-D show a series of channel mounted devices 36—emergency light 102, strobe 104, environmental sensor 106, smoke detector 108, broadcast sprinkler 110, concealed sprinkler 112, speaker 114, camera 116, and panoramic camera 118. FIGS. 13A-B show the appearance of each of the devices 102-118 from the room side. As can be seen in FIGS. 13B-D, the channel 24 is flush mounted so that the channel 24 does not protrude below the plane of the front surface 16 of the ceiling panels 14. Likewise, the individual devices 102-118 do not protrude substantially from the channel 24 below the plane of the front surface 16 of the ceiling panels 14. FIG. 13C shows the aesthetic appearance of the channel mounted devices 36 from the room side with the devices 36 in the channel 24 flush with the plane of the front surface 16 of the ceiling panels 14.

FIGS. 14A-D show a series of channel mounted devices 36—emergency light 102, strobe 104, environmental sensor 106, smoke detector 108, broadcast sprinkler 110, concealed sprinkler 112, speaker 114, camera 116, and panoramic camera 118. FIGS. 14A-B show the appearance of each of the devices 102-118 from the room side. As can be seen in FIGS. 13B-D, the channel 24 is surface mounted so that the channel 24 protrudes below the plane of the front surface 16 of the ceiling panels 14. The individual devices 102-118, however, do not protrude substantially from the channel 24 as shown in FIG. 14B. FIG. 14C shows the aesthetic appearance of the channel mounted devices 36 from the room side with the devices 36 in the channel 24. The channel 24 is surface mounted, and the channel 24 protrudes below the plane of the front surface 16 of the ceiling panels 14.

Figure 8A:
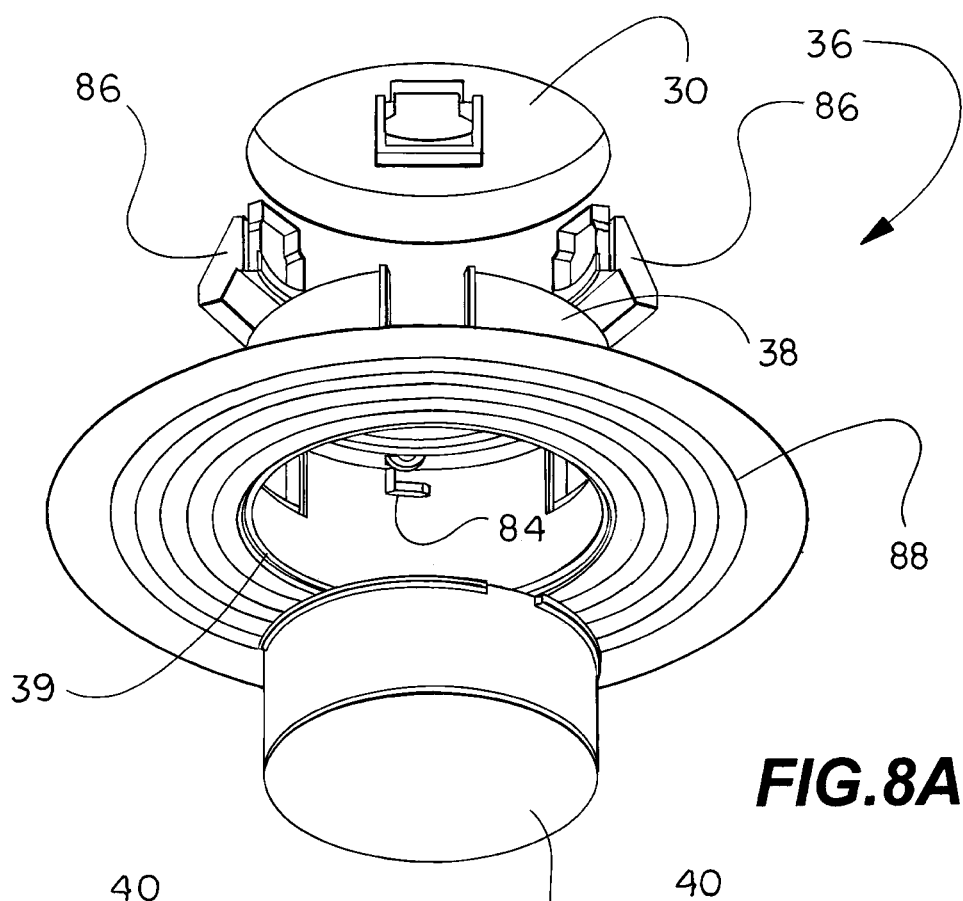
FIG. 8A is an exploded perspective room side view of one of the devices mounted flush with the plane of the ceiling including a housing, a device case, and a mounting flange all in accordance with the present invention.
Figure 8C:
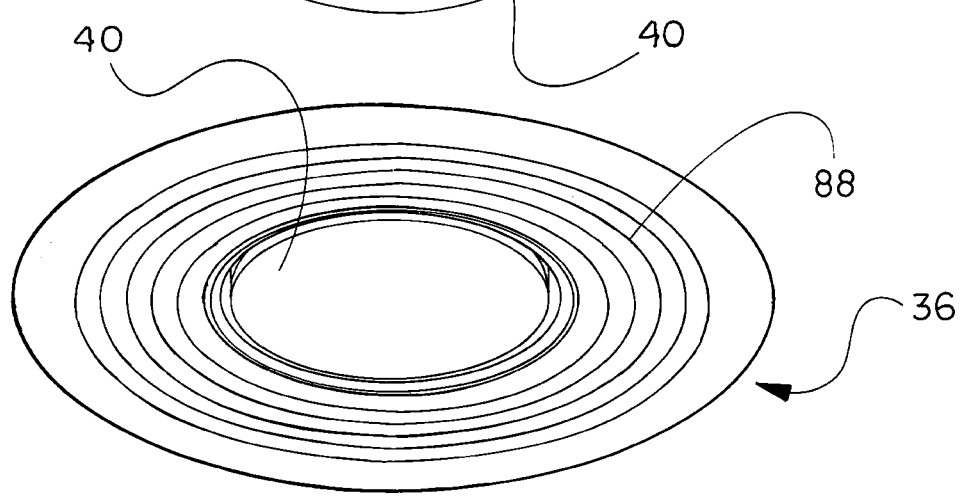
FIG. 8C is a perspective room side view of one of the devices mounted flush with the plane of the ceiling including the housing, the device case, and the mounting flange prior to adding a ceiling finish all in accordance with the present invention.
Figure 8D:
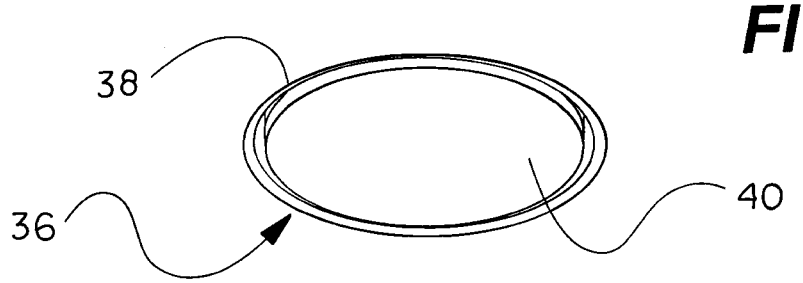
FIG. 8D is a perspective room side view of one of the devices mounted flush with the plane of the ceiling including the housing, the device case, and the mounting flange after adding a ceiling finish all in accordance with the present invention.
Figure 8B:
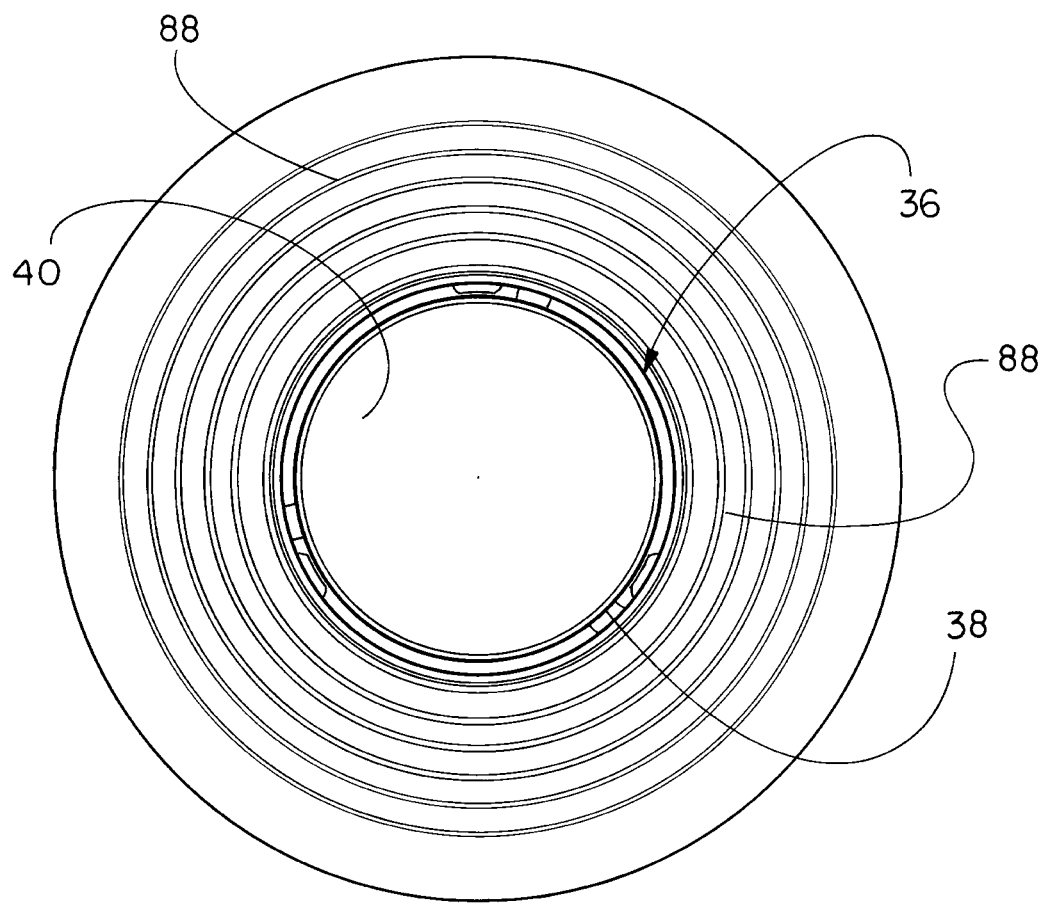
FIG. 8B is a plan room side view of one of the devices mounted flush with the plane of the ceiling including the housing, the device case, and the mounting flange all in accordance with the present invention.
Figure 8E:
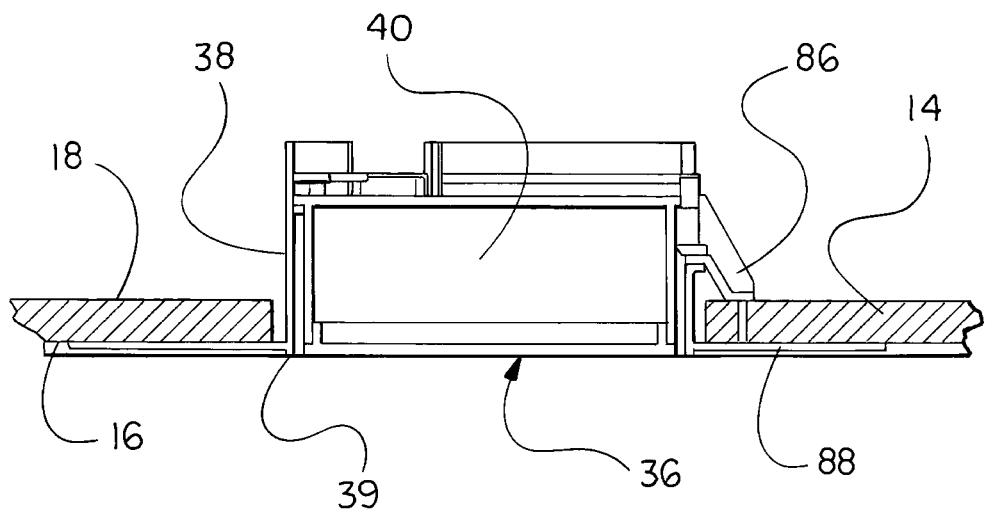
FIG. 8E is a side elevation section view of one of the devices mounted flush with the plane of the ceiling including the housing, the device case, and the mounting flange all in accordance with the present invention.

Alternatively, the channel 24 can be eliminated and housings 38 can be mounted directly to the ceiling, either flush mounted or surface mounted. FIGS. 8A-E, 9A-D, and 11A-F show the devices 36 flush mounted with the front room side surface 16 of the ceiling panels 14 or drywall. With reference to FIG. 8A, the housing 38 is inserted into an opening 30 in the ceiling panel 14. The housing 38 has fixing clips 86 that engage the backside 18 of the ceiling panel 14 such that the room side end 39 of the housing 38 is flush with the room side 16 of ceiling panel 14 as best seen in FIG. 8E. When the housing 38 is secured in the opening 30 of the ceiling panel 14, the case 40 is inserted into the housing 38 and secured by bayonet connectors 84. As will be discussed in greater detail, the casing 40 is standardized to accommodate each of the devices 102-118. The housing 38 in FIG. 8A-E further has a mounting flange 88 attached to the room side end 39 of the housing 38. The mounting flange 88 distributes load over an area of the room side surface 16 of the ceiling panel 14. Once the housing 38 is mounted in place, the mounting flange 88 is concealed by a ceiling finish.

FIGS. 9A-D show the housing 38 that is flush mounted and is in all respects the same as the housing 38 shown in FIGS. 8A-E except that the housing 38 does not have a mounting flange 88.

FIGS. 10A-D and 12A-D show the devices 36 surface mounted on the front room side surface 16 of the ceiling panels 14 or drywall. With reference to FIG. 10A, a junction box 91 with mounting brackets 90 is installed in conventional fashion above the ceiling panel 14. With reference to the FIG. 10A, an adapter plate 92 is connected to the brackets 90 of the junction box 91. The housing 38 is attached to the adapter plate 92 by means of screws or other suitable connectors. Once the housing 38 is secured below the opening 30 of the ceiling panel 14, the case 40 is inserted into the housing 38 and secured with bayonet clips 84. As best seen in FIGS. 10D and 12D, the housing 38, with the attached casing 40, extends below the room side surface 16 of the ceiling panel 14. As will be discussed in greater detail, the case 40 accommodates each of the devices 102-118.

Figure 11B:
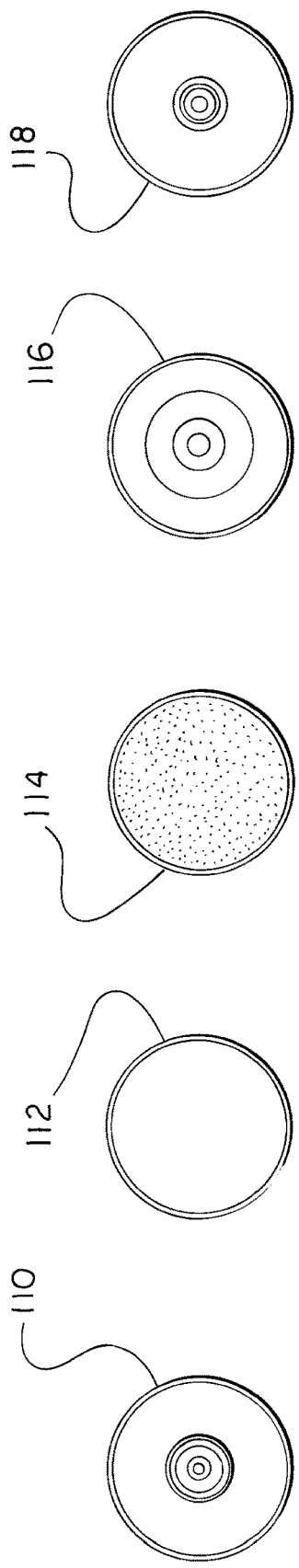
FIG. 11B is a plan room side view of several of the devices mounted flush in the ceiling all in accordance with the present invention.
Figure 11D:
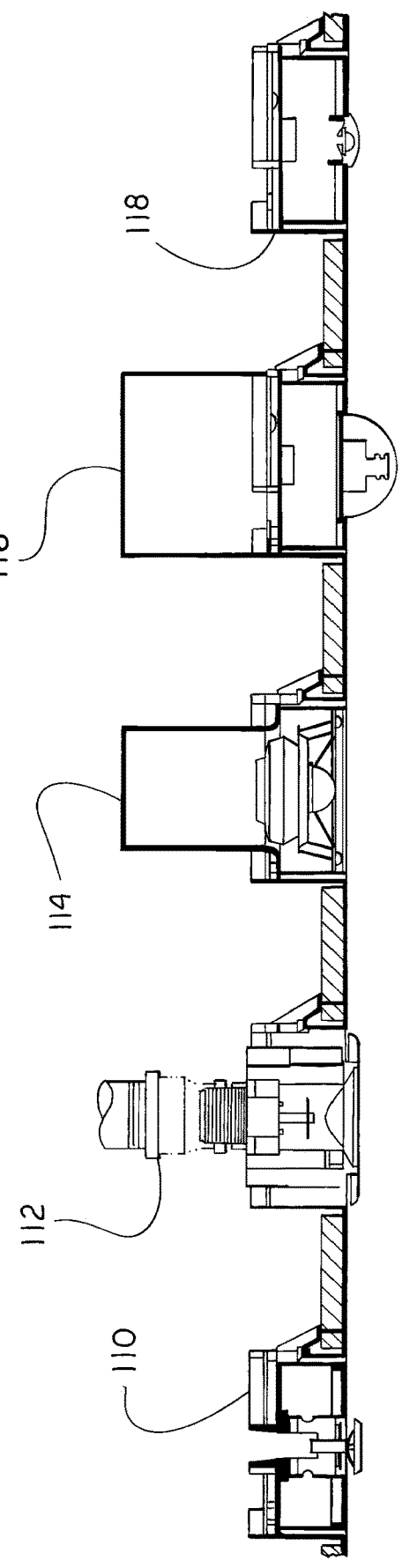
FIG. 11D is a side elevation section view of several of the devices mounted flush in the ceiling all in accordance with the present invention.
Figure 16A:
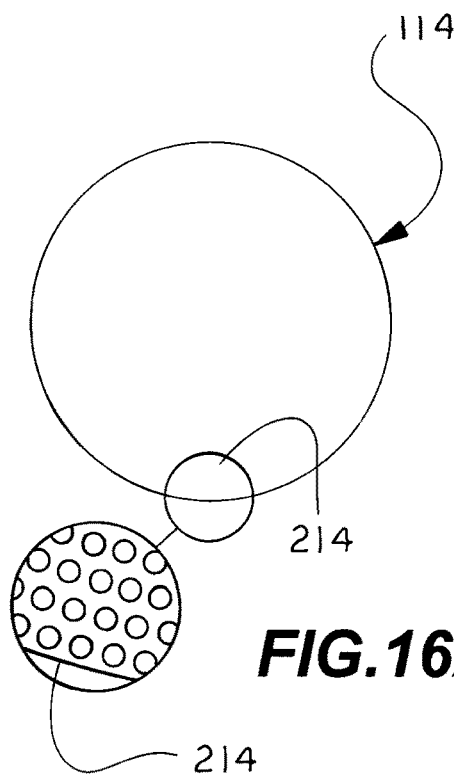
FIG. 16A is a plan room side view of the speaker device in accordance with the present invention.
Figure 16C:
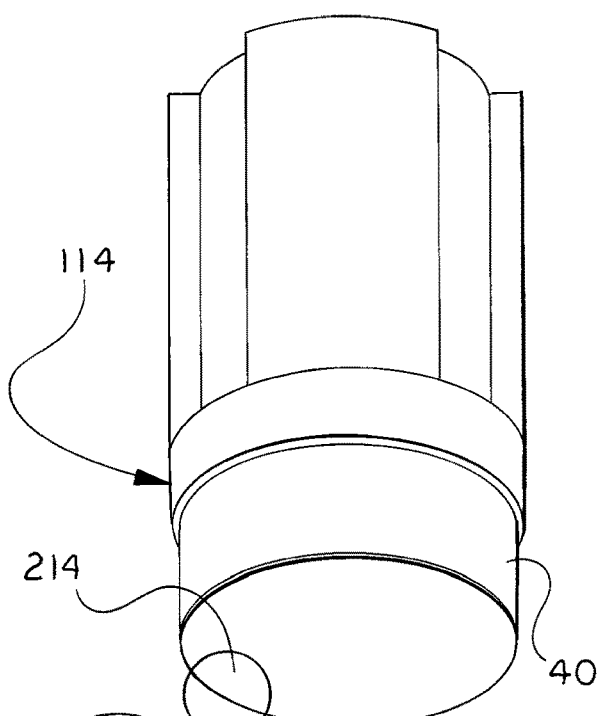
FIG. 16C is a perspective room side view of the speaker device in accordance with the present invention.
Figure 16B:
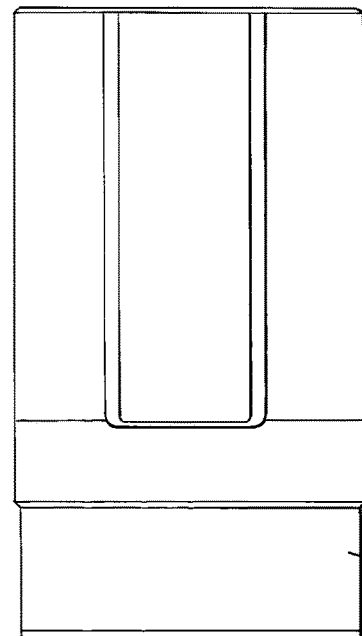
FIG. 16B is a side elevation view of the speaker device in accordance with the present invention.
Figure 16D:
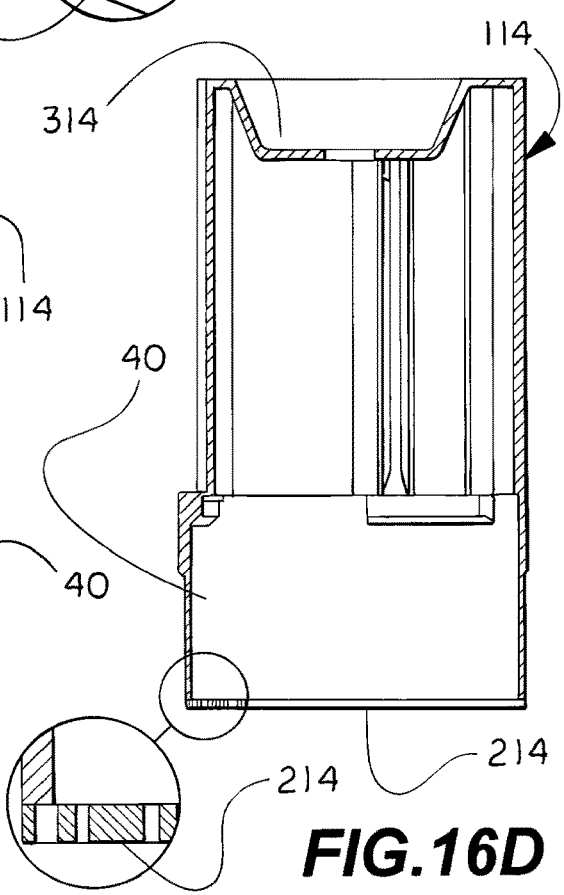
FIG. 16D is a side elevation section view of the speaker device in accordance with the present invention.
Figure 17A:
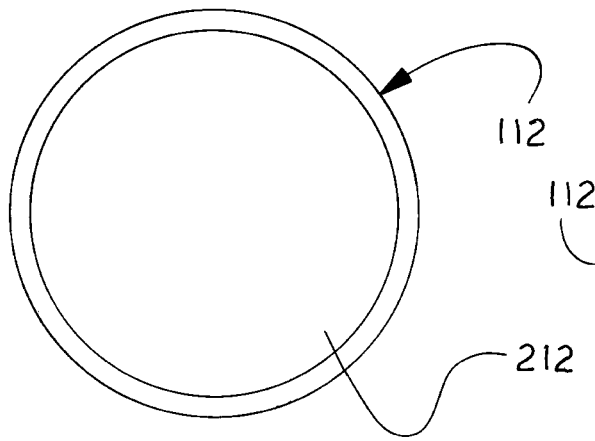
FIG. 17A is a plan room side view of the concealed sprinkler device in accordance with the present invention.
Figure 17C:
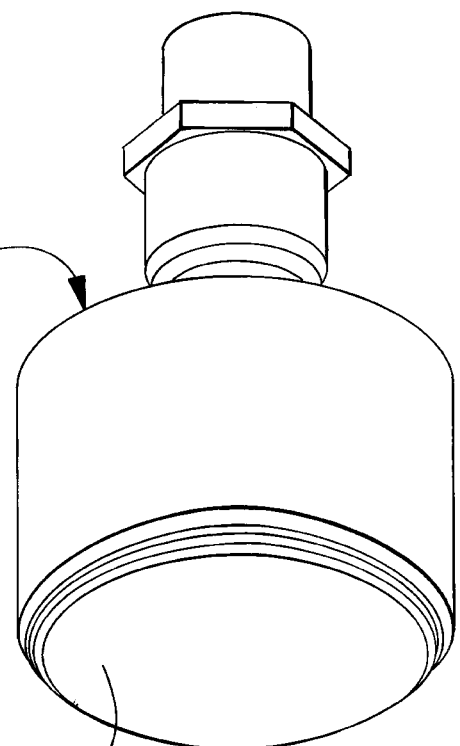
FIG. 17C is a perspective room side view of the concealed sprinkler device in accordance with the present invention.
Figure 17B:
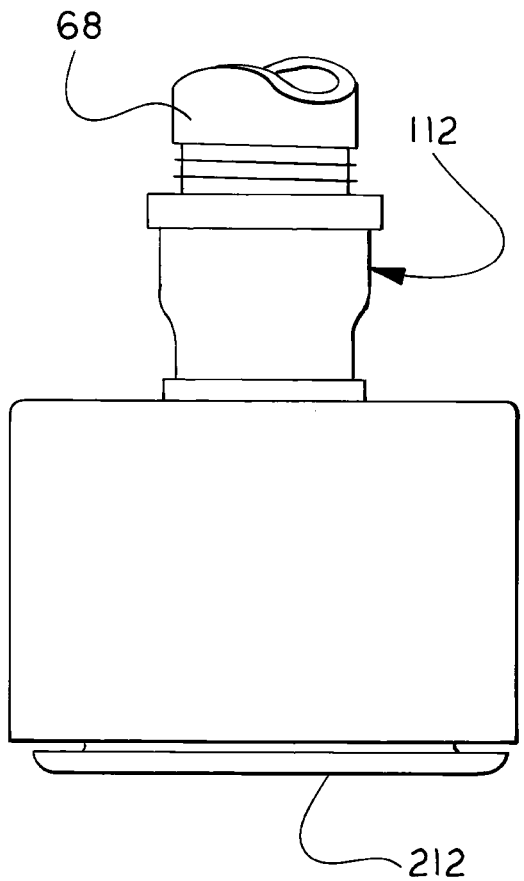
FIG. 17B is a side elevation view of the concealed sprinkler device in accordance with the present invention.
Figure 17D:
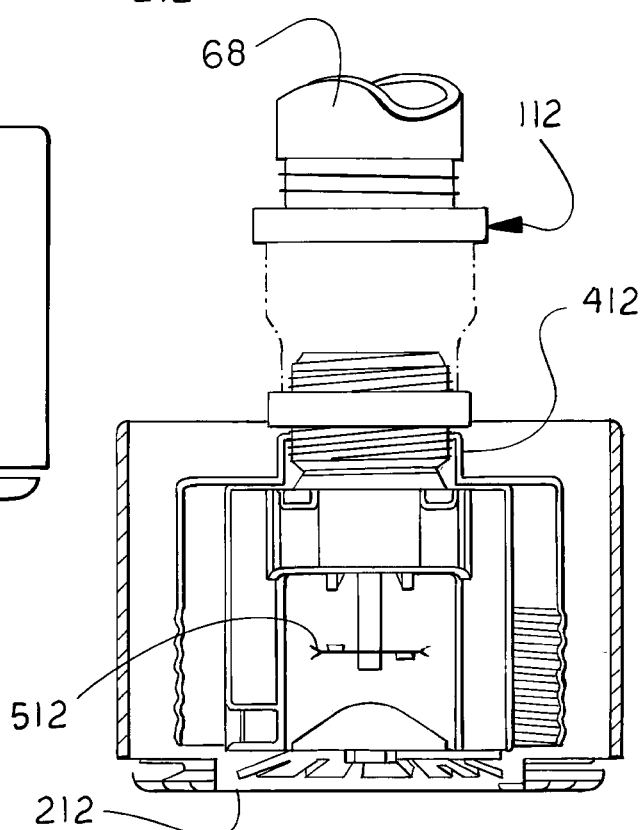
FIG. 17D is a side elevation section view of the concealed sprinkler device in accordance with the present invention.
Figure 19C:
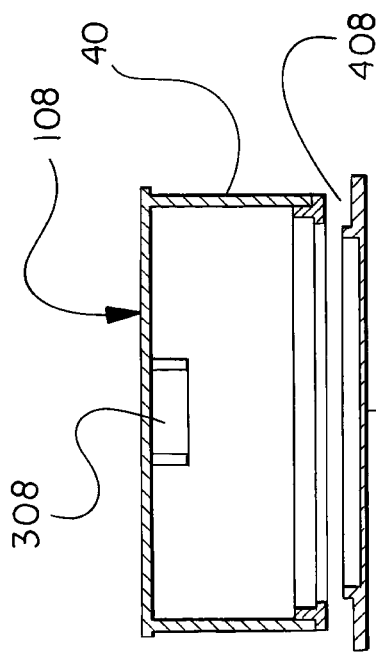
FIG. 19C is a perspective room side view of the smoke detector device in accordance with the present invention.
Figure 19D:
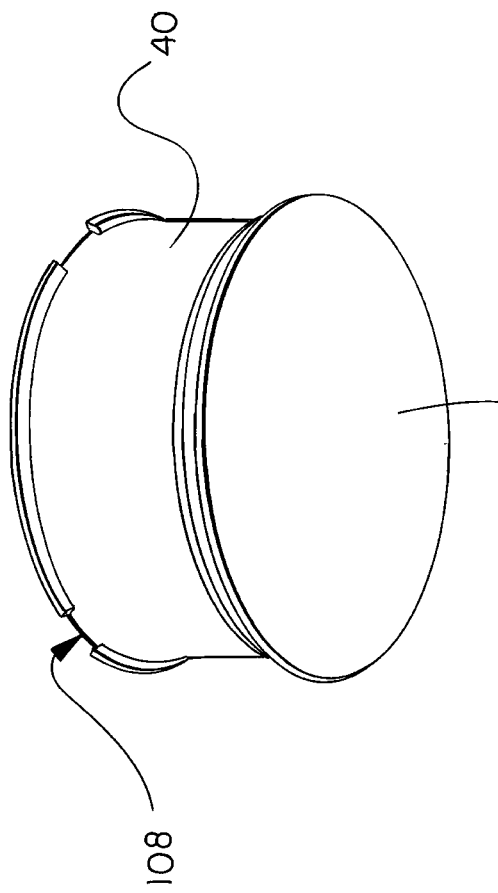
FIG. 19D is a side elevation section view of the smoke detector device in accordance with the present invention.
Figure 19A:
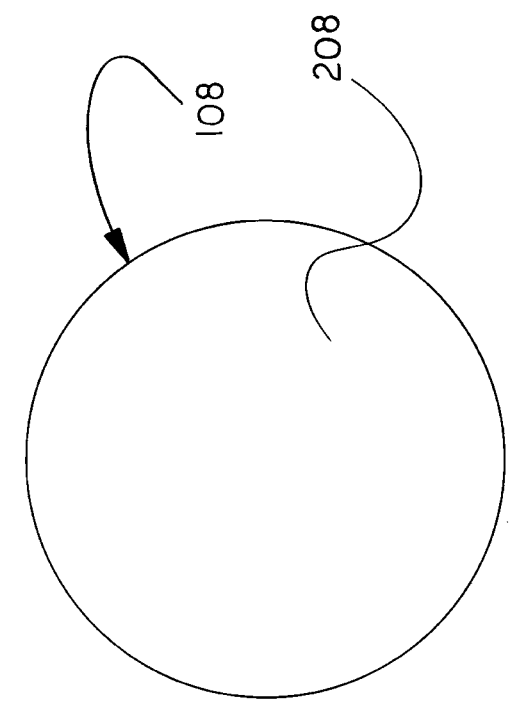
FIG. 19A is a plan room side view of the smoke detector device in accordance with the present invention.
Figure 19B:
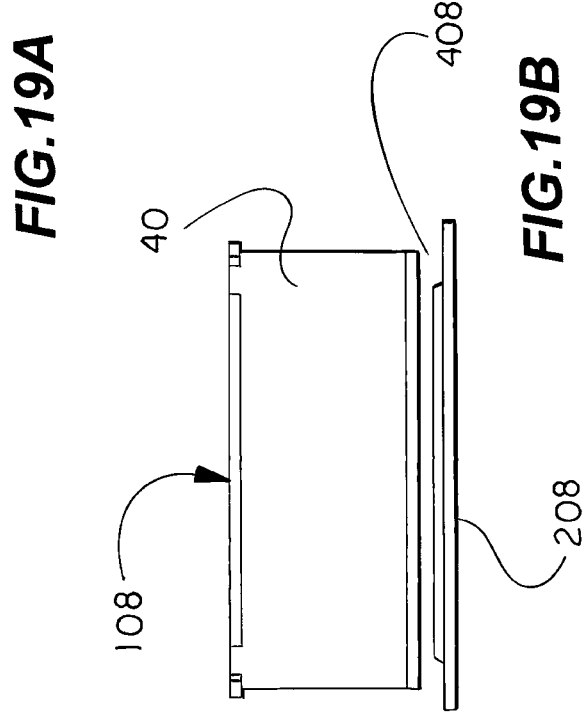
FIG. 19B is a side elevation view of the smoke detector device in accordance with the present invention.

FIGS. 11A-F show a series of flush mounted devices 36—emergency light 102, strobe 104, environmental sensor 106, smoke detector 108, broadcast sprinkler 110, concealed sprinkler 112, speaker 114, camera 116, and panoramic camera 118. FIGS. 11A-B show the appearance of each of the devices 36 from the room side. FIGS. 11C-D show the individual devices 102-118 in section and flush mounted. The devices 102-118 will be described in greater detail below. FIG. 11E shows the aesthetic appearance of the flush mounted devices 36 from the room side. The individual devices 102-118 will be described in greater detail below.

FIG. 12A is a plan view from the room side of the ceiling showing the appearance of each of the surface mounted devices—emergency light 102, emergency strobe 104, environmental sensor 106, and smoke detector 108. FIG. 12D shows the mounting for each of the devices 36, and FIG. 12B shows the mounting for each of the individual devices 102-108. FIG. 12C shows the aesthetic appearance of the uniformly sized and shaped devices 36 when surface mounted.

FIGS. 15A-15D illustrate the device 36 for the security camera 116. The security camera 116 comprises a case 40, a protective transparent dome 216, and a camera unit 316. As previously discussed, the case 40 is standardized in size and shape to fit any of the uniformly sized and shaped housings 38 of the modular ceiling 10.

FIGS. 16A-16D illustrate the device 36 for the speaker 114. The speaker 114 comprises a case 40, a speaker grill 214, and a speaker unit 314. As previously discussed, the case 40 is standardized in size and shape to fit any of the uniformly sized and shaped housings 38 of the modular ceiling 10.

FIGS. 17A-17D illustrate the device 36 for the concealed sprinkler 112. The concealed sprinkler 112 comprises a case 40, a cover plate 212, a sprinkler pipe 68 connected to a source of water, a deployment mechanism 412, and a sprinkler head 512. As previously discussed, the case 40 is standardized in size and shape to fit any of the uniformly sized and shaped housings 38 of the modular ceiling 10. When in use, water pressure activates the deployment mechanism 412 causing the sprinkler head 512 to extend out of the casing 40 into the room below.

FIGS. 18A-18D illustrate the device 36 for the broadcast sprinkler 110. The broadcast sprinkler 110 comprises a case (not shown), a cover plate 210, a sprinkler pipe 68 connected to a source of water, and a sprinkler head 310. As previously discussed, the case 40 is standardized in size and shape to fit any of the uniformly sized and shaped housings 38 of the modular ceiling 10. When in use, water is broadcast in a pattern into the room from the sprinkler head 310.

FIGS. 19A-19D illustrate the device 36 for the smoke detector 108. The smoke detector 108 comprises a case 40, a cover plate 208, and a smoke detector unit 308. As previously discussed, the case 40 is standardized in size and shape to fit any of the uniformly sized and shaped housings 38 of the modular ceiling 10. A gap 408 is provided between the housing 40 and a cover plate 208 to allow smoke to enter the housing 40 and reached the smoke detector unit 308.

FIGS. 20A-20D illustrate the device 36 for the environmental sensor 106, in this case a motion sensor. The environmental sensor 106 comprises a case 40, a cover plate 206, and a motion sensor unit 306. Other sensor units, besides a motion sensor unit 360, may be used in connection with the environmental sensor 106. Such sensor units may include temperature sensor units, light sensor units, etc. As previously discussed, the case 40 is standardized in size and shape to fit any of the uniformly sized and shaped housings 38 of the modular ceiling 10. In addition to a smoke detector, the environmental sensor 106 can include a temperature sensor, an occupancy sensor, a light sensor, etc.

FIGS. 21A-21D illustrate the device 36 for the strobe 104. The strobe at 104 comprises a case 40, a cover plate 204, and a strobe light unit 304. As previously discussed, the case 40 is standardized in size and shape to fit any of the uniformly sized and shaped housings 38 of the modular ceiling 10.

FIGS. 22A-22D illustrate the device 36 for the emergency light 102. The emergency light 102 comprises a case 40, a cover plate 202, and a light 302. As previously discussed, the case 40 is standardized in size and shape to fit any of the uniformly sized and shaped housings 38 of the modular ceiling 10.

FIGS. 23A-23D illustrate the device 36 for the panoramic security camera 118. The panoramic security camera 118 comprises a case 40, a cover plate 218, and panoramic camera unit 318. As previously discussed, the case 40 is standardized in size and shape to fit any of the uniformly sized and shaped housings 38 of the modular ceiling 10.

Figure 24:
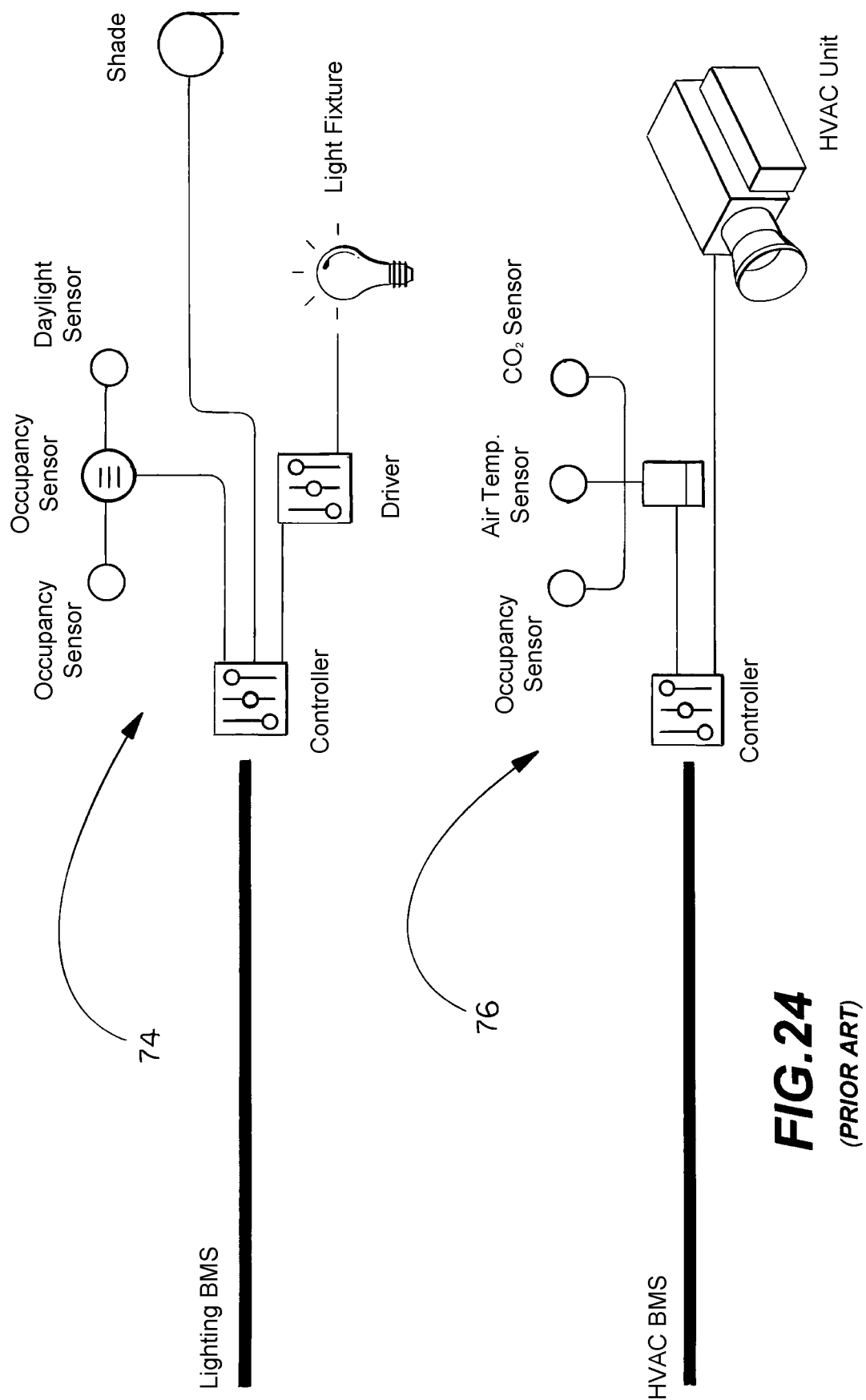
FIG. 24 is a schematic of a device control network for a ceiling system in accordance with the prior art.

FIG. 24 shows a typical prior art ceiling system configuration with a first network and control system 74 for managing the lights for a building space and a second separate network and control system 76 for managing the environment and occupancy of the building space. In such a prior art ceiling configuration, the network and control systems 74 and 76 are separate and do not have interoperability between them.

Figure 25:
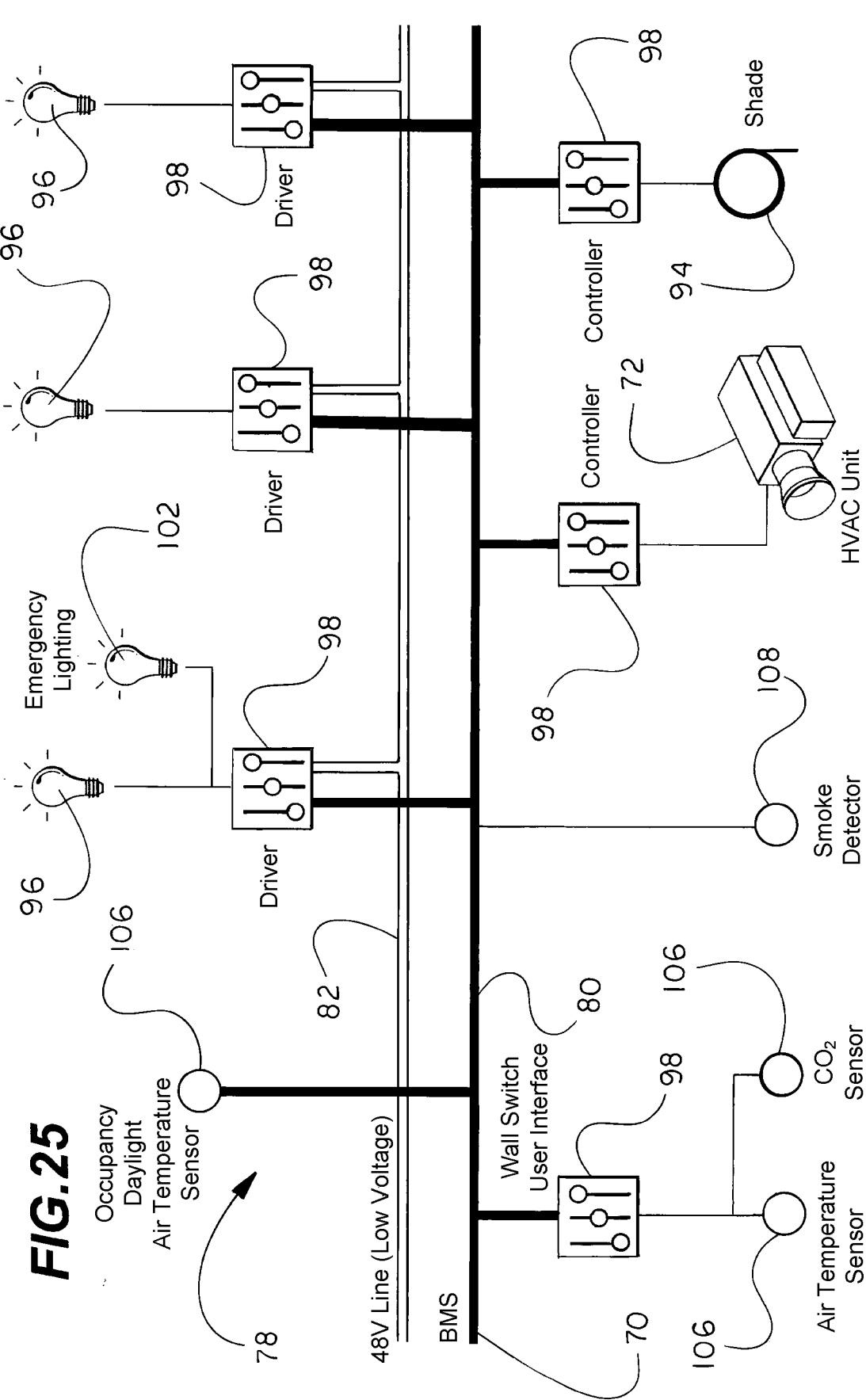
FIG. 25 is a schematic of a device control network the for modular ceiling system in accordance with the present invention.

FIG. 25 shows an example of the modular ceiling system 10 in which a single device network 78 controls the lights 96 and the environment for a room (for example, environmental sensors 106, smoke detector 108, HVAC unit 72, window shade 94, and emergency lighting 102). The network 78 has control line 80 that is connected to a central building management system (not shown). In addition, the network 78 is powered by a low-voltage line 82. All of the devices are connected to the control line 80 and are managed by a single network protocol from the central building management system. In addition, the driver/controller/user interface modules 98 are micro controllers that allow the user interface, the controllers, and the drivers to communicate directly with each other independently from the building management system 70.

Figure 26:
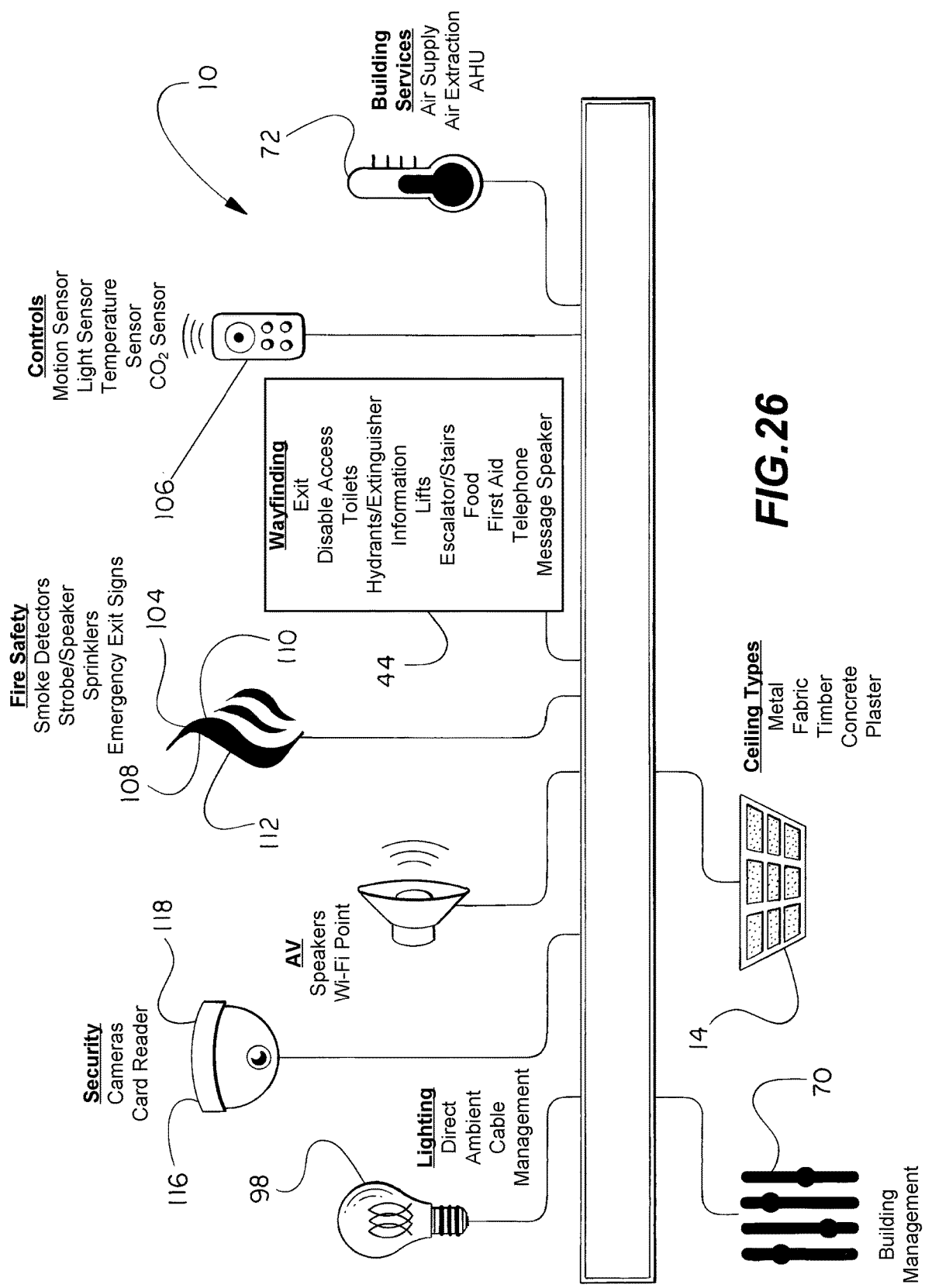
FIG. 26 is a schematic of a device control network for the modular ceiling system in accordance with the present invention.

FIG. 26 illustrates the various devices for the modular ceiling system 10. The modular ceiling system 10 provides a substantial number of advantages including for example, simplifying the exchanging of physically and electrically compatible devices, flexibility for reconfiguration when room layout changes occur, generating localized atmospheres within a room, allowing retrofitting for future technology, reducing time and cost of installation, reducing backroom infrastructure, reducing installation costs based on reducing the number of trades involved in the ceiling installation, and providing a minimalist and coordinated appearance.

Figure 27:
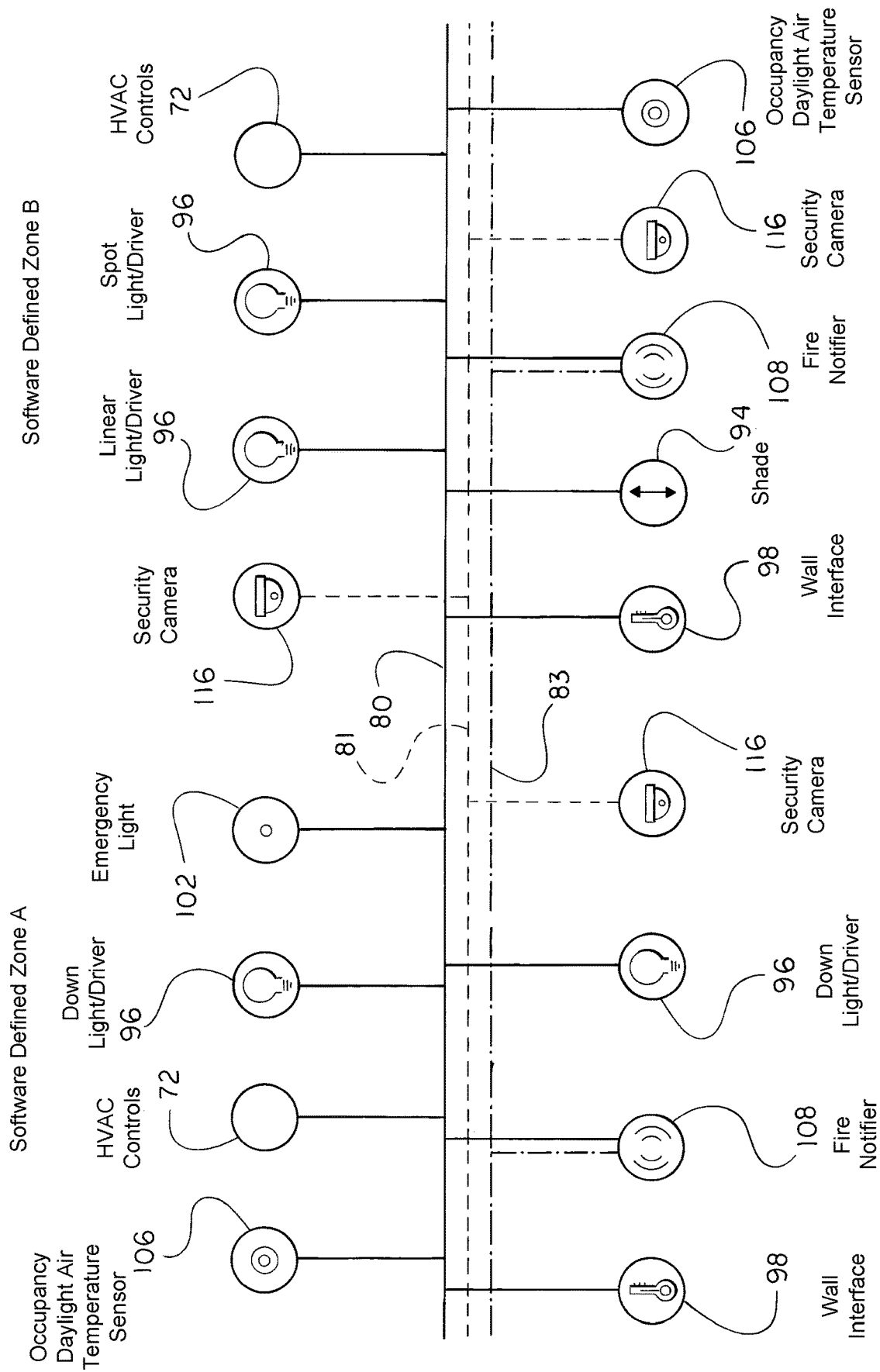
FIG. 27 is a schematic of another device control network for the modular ceiling system in accordance with the present invention.

FIG. 27 illustrates shows a device network 79 for a modular ceiling system 10. The device network 79 has a control line 80, a security line 81, and a fire line 83. The control line 80 interconnects for example environmental sensors 106, lighting 96, HVAC units 72, interface modules 98, window shade 94, emergency lighting 102, and smoke detector/fire notifier 108. Security cameras 116 are interconnected by security line 81. In addition, the smoke detector/fire notifier 108 is also connected to fire line 83. As previously indicated, each of the devices has the ability to communicate with every other interconnected device. As shown in FIG. 27, the devices share the same wiring and network. Zones are defined by software and can be created, deleted, and merged as occupancy requirements change for the building. Software configuration is done by way of a computer (not shown) plugged into the USB port of any wall interface modules 98. Devices communicate with devices in their software zone on an ad-hoc basis, rather than through a centralized system.

While this invention has been described with reference to preferred embodiments thereof, it is to be understood that variations and modifications can be affected within the spirit and scope of the invention as described herein and as described in the appended claims.

We claim:
1. A modular ceiling system comprising:
   a. a ceiling support structure for supporting a ceiling having a room side;
   b. at least one channel supported by the ceiling support structure the channel having a length and including support clips extending along the length of the channel to support a conduit;
   c. a plurality of uniformly sized and shaped separate openings in the channel;
   d. a plurality of uniformly sized and shaped devices fitted to the openings, the devices of the plurality of devices have different functions and the devices are connected to a network having a common communication protocol;
   e. a central control system having the same communication protocol as the devices; and
   f. the network connecting the central control system and all of the devices together and communications among the central control system and the devices uses the common communication protocol wherein wires for the network are enclosed in the conduit.

2. The modular ceiling system of claim 1, wherein the channel is supported by the ceiling support structure so that the channel is recessed above the ceiling room side.

3. The modular ceiling system of claim 1, wherein the channel is supported by the ceiling support structure so that the channel protrudes below the ceiling room side.

4. The modular ceiling system of claim 1, wherein each device comprises a housing fitted in and attached to the opening and a case that attaches to the housing and wherein the case contains and operative unit for each device.

5. The modular ceiling system of claim 4, wherein each case is interchangeable with each other case so that the cases with the contained operative unit can be swapped between and among housings.

6. The modular ceiling system of claim 1, wherein the devices share a common power supply.

7. The modular ceiling system of claim 1, wherein the devices include an emergency light.

8. The modular ceiling system of claim 1, wherein the devices include a strobe.

9. The modular ceiling system of claim 1, wherein the devices include an environmental sensor.

10. The modular ceiling system of claim 1, wherein the devices include a smoke detector.

11. The modular ceiling system of claim 1, wherein the devices include a broadcast sprinkler.

12. The modular ceiling system of claim 1, wherein the devices include a concealed sprinkler.

13. The modular ceiling system of claim 1, wherein the devices include a speaker.

14. The modular ceiling system of claim 1, wherein the devices include a camera.

15. The modular ceiling system of claim 1, wherein the modular ceiling system further includes a drop-down access tray.

16. The modular ceiling system of claim 1, wherein the devices include an emergency light.

17. A modular ceiling system comprising:
   a. a ceiling support structure for supporting a ceiling having a room side;
   b. a plurality of uniformly sized and shaped separate openings in the ceiling;
   c. a plurality of uniformly sized and shaped devices fitted to the openings, the devices of the plurality of devices have different functions, and the devices with different functions are connected to a network having a common communication protocol and a common power source;
   d. a central control system having the same communication protocol as the devices;
   e. the network connecting the central control system and all of the devices together and communications among the central control system and the devices uses the common communication protocol; and
   f. a drop-down tray for access to functional components of the modular ceiling system, for accommodating a video monitor, or for accommodating signage.

18. The modular ceiling system of claim 17, wherein the devices are supported by the ceiling so that the devices are recessed above the ceiling room side.

19. The modular ceiling system of claim 17, wherein the devices are supported by the ceiling so that the devices protrude below the ceiling room side.

20. The modular ceiling system of claim 17, wherein each device comprises a housing fitted in and attached to the opening and a case that attaches to the housing and wherein the case contains and operative unit for each device.

21. The modular ceiling system of claim 20, wherein each case is interchangeable with each other case so that the cases with the contained operative unit can be swapped between and among housings.

22. The modular ceiling system of claim 17, wherein the devices include an emergency light.

23. The modular ceiling system of claim 17, wherein the devices include a strobe.

24. The modular ceiling system of claim 17, wherein the devices include an environmental sensor.

25. The modular ceiling system of claim 17, wherein the devices include a smoke detector.

26. The modular ceiling system of claim 17, wherein the devices include a broadcast sprinkler.

27. The modular ceiling system of claim 17, wherein the devices include a concealed sprinkler.

28. The modular ceiling system of claim 17, wherein the devices include a speaker.

29. The modular ceiling system of claim 17, wherein the devices include a camera.

30. The modular ceiling system of claim 17, wherein the devices include an emergency light.

31. A modular ceiling system comprising:
   a. a ceiling support structure for supporting a ceiling having a room side;
   b. a plurality of uniformly sized and shaped separate openings in the ceiling;
   c. a plurality of uniformly sized and shaped devices with diverse functions fitted to the openings, wherein each device comprises:
      i. a housing fitted into and attached to the opening and a case inserted into and attached to the housing;
      ii. the case contains an operative unit for each device; and
      iii. each case is interchangeable with each other case so that the cases with the contained operative unit can be swapped between and among housings.

32. The modular ceiling system of claim 31, wherein the devices are supported by the ceiling so that the devices are recessed above the ceiling room side.

33. The modular ceiling system of claim 31, wherein the devices are supported by the ceiling so that the devices protrude below the ceiling room side.

34. A modular ceiling system comprising:
   a. a ceiling support structure for supporting a ceiling having a room side;

b. a plurality of uniformly sized and shaped separate openings in the ceiling;
c. a plurality of uniformly sized and shaped devices with diverse functions fitted to the openings, wherein the devices share a common power supply and wherein each device comprises:
  i. a housing fitted into and attached to the opening and a case inserted into and attached to the housing;
  ii. the case contains an operative unit for each device; and
  iii. each case is interchangeable with each other case so that the cases with the contained operative unit can be swapped between and among housings.

\* \* \* \* \*